(12) United States Patent
Sugita et al.

(10) Patent No.: US 11,063,251 B2
(45) Date of Patent: Jul. 13, 2021

(54) SECONDARY BATTERY-USE ANODE ACTIVE MATERIAL, SECONDARY BATTERY-USE ANODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Shuhei Sugita, Kanagawa (JP); Yuko Taki, Tokyo (JP); Akira Ichihashi, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/325,534

(22) PCT Filed: Jun. 23, 2015

(86) PCT No.: PCT/JP2015/068046
§ 371 (c)(1),
(2) Date: Jan. 11, 2017

(87) PCT Pub. No.: WO2016/009794
PCT Pub. Date: Jan. 21, 2016

(65) Prior Publication Data
US 2017/0149057 A1    May 25, 2017

(30) Foreign Application Priority Data
Jul. 18, 2014  (JP) .............................. JP2014-147657

(51) Int. Cl.
*H01M 4/36* (2006.01)
*H01M 4/587* (2010.01)
(Continued)

(52) U.S. Cl.
CPC ............. *H01M 4/366* (2013.01); *B60L 58/10* (2019.02); *H01M 4/36* (2013.01); *H01M 4/38* (2013.01);
(Continued)

(58) Field of Classification Search
CPC ......... H01M 10/0525; H01M 10/0565; H01M 10/0566; H01M 2004/027;
(Continued)

(56) References Cited

U.S. PATENT DOCUMENTS

| 2001/0004504 A1 | 6/2001 | Nakamizo et al. |
| 2002/0028379 A1 | 3/2002 | Okado et al. |

(Continued)

FOREIGN PATENT DOCUMENTS

| CN | 101958426 | 1/2011 |
| EP | 2950370 | 12/2015 |

(Continued)

OTHER PUBLICATIONS

Machine Translation JP2006134682A (Year: 2006).*
(Continued)

*Primary Examiner* — Victoria H Lynch
(74) *Attorney, Agent, or Firm* — Sheridan Ross P.C.

(57) ABSTRACT

The secondary battery includes a cathode, an anode, and an electrolytic solution. The anode includes an anode current collector and an anode active material layer that includes an anode active material, and is provided on the anode current collector, a surface of the anode active material being covered with one or more coatings containing one or both of polyvinylidene fluoride and a copolymer of polyvinylidene fluoride.

21 Claims, 9 Drawing Sheets

(51) Int. Cl.
| | |
|---|---|
| *H01M 10/0565* | (2010.01) |
| *H01M 10/0566* | (2010.01) |
| *H01M 4/48* | (2010.01) |
| *H01M 4/38* | (2006.01) |
| *H01M 4/62* | (2006.01) |
| *H01M 4/58* | (2010.01) |
| *H01M 10/0525* | (2010.01) |
| *B60L 58/10* | (2019.01) |
| *H01M 50/20* | (2021.01) |
| *H01M 50/409* | (2021.01) |
| *H01M 4/02* | (2006.01) |

(52) U.S. Cl.
CPC .......... *H01M 4/386* (2013.01); *H01M 4/387* (2013.01); *H01M 4/48* (2013.01); *H01M 4/58* (2013.01); *H01M 4/587* (2013.01); *H01M 4/62* (2013.01); *H01M 4/623* (2013.01); *H01M 10/0525* (2013.01); *H01M 10/0565* (2013.01); *H01M 10/0566* (2013.01); *H01M 50/20* (2021.01); *H01M 50/409* (2021.01); *B60L 2210/00* (2013.01); *B60L 2240/54* (2013.01); *H01M 2004/027* (2013.01); *H01M 2220/20* (2013.01); *Y02E 60/10* (2013.01); *Y02T 10/70* (2013.01)

(58) Field of Classification Search
CPC ...... H01M 2220/20; H01M 2/10; H01M 2/16; H01M 4/36; H01M 4/366; H01M 4/38; H01M 4/386; H01M 4/387; H01M 4/48; H01M 4/58; H01M 4/587; H01M 4/62; H01M 4/623

See application file for complete search history.

(56) References Cited

U.S. PATENT DOCUMENTS

| | | | |
|---|---|---|---|
| 2007/0072077 A1* | 3/2007 | Kusumoto | ............ H01M 4/621 429/218.1 |
| 2011/0014518 A1 | 1/2011 | Nakai et al. | |
| 2011/0300444 A1 | 12/2011 | Nakamura et al. | |
| 2013/0224558 A1* | 8/2013 | Kim | ........................ C08L 23/02 429/145 |
| 2013/0273424 A1* | 10/2013 | Watanabe | ............ C09D 127/16 429/217 |

FOREIGN PATENT DOCUMENTS

| | | |
|---|---|---|
| JP | 9-219197 A | 8/1997 |
| JP | 2006-134682 | 5/2006 |
| JP | 2007-128723 A | 5/2007 |
| JP | 2007-157499 | 6/2007 |
| JP | 2008-243441 | 10/2008 |
| JP | 2011-253762 A | 12/2011 |
| JP | 2012-256505 | 12/2012 |
| WO | WO 2013/002369 A1 | 1/2013 |

OTHER PUBLICATIONS

Official Action (no English translation available) for Japanese Patent Application No. 2014-147657, dated Apr. 3, 2018, 5 pages.
Official Action (no English translation available) for Japanese Patent Application No. 2014-147657, dated Oct. 31, 2017, 5 pages.
Extended Search Report for European Patent Application No. 15821711.7, dated Nov. 30, 2017, 9 pages.
International Search Report prepared by the Japan Patent Office dated Sep. 17, 2015, for International Application No. PCT/JP2015/068046.
Official Action (no English translation available) for Chinese Patent Application No. 201580035351.9, dated Oct. 18, 2018, 14 pages.
Official Action (no English translation available) for Chinese Patent Application No. 201580035351.9, dated Aug. 15, 2019, 12 pages.
Official Action (no English translation available) for Chinese Patent Application No. 201580035351.9, dated Sep. 2, 2020, 9 pages.
Official Action (no English translation available) for Chinese Patent Application No. 201580035351.9, dated Apr. 26, 2020, 10 pages.

* cited by examiner

[ FIG. 1 ]
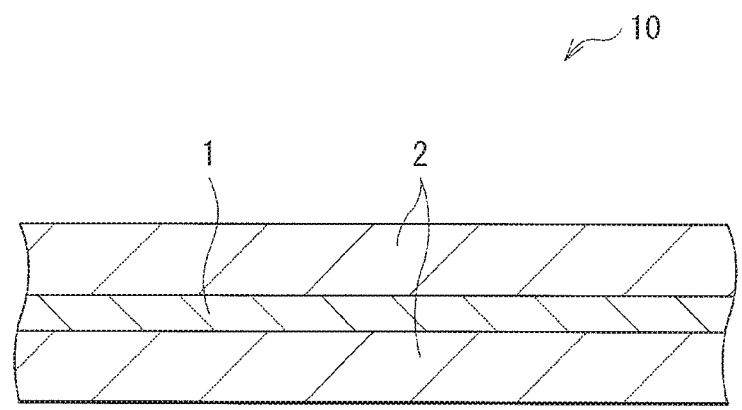
[ FIG. 2 ]
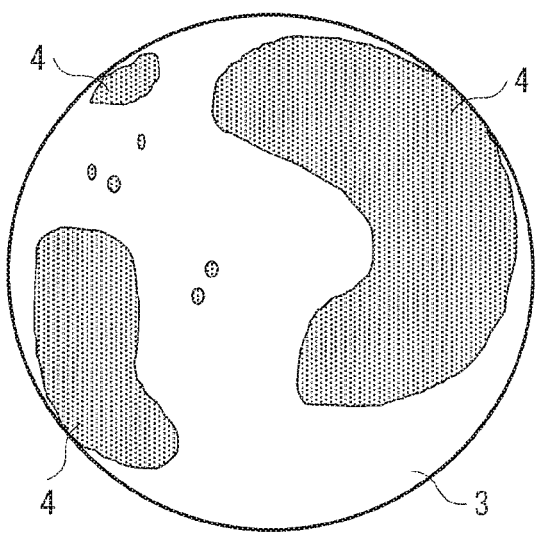

[FIG.3]
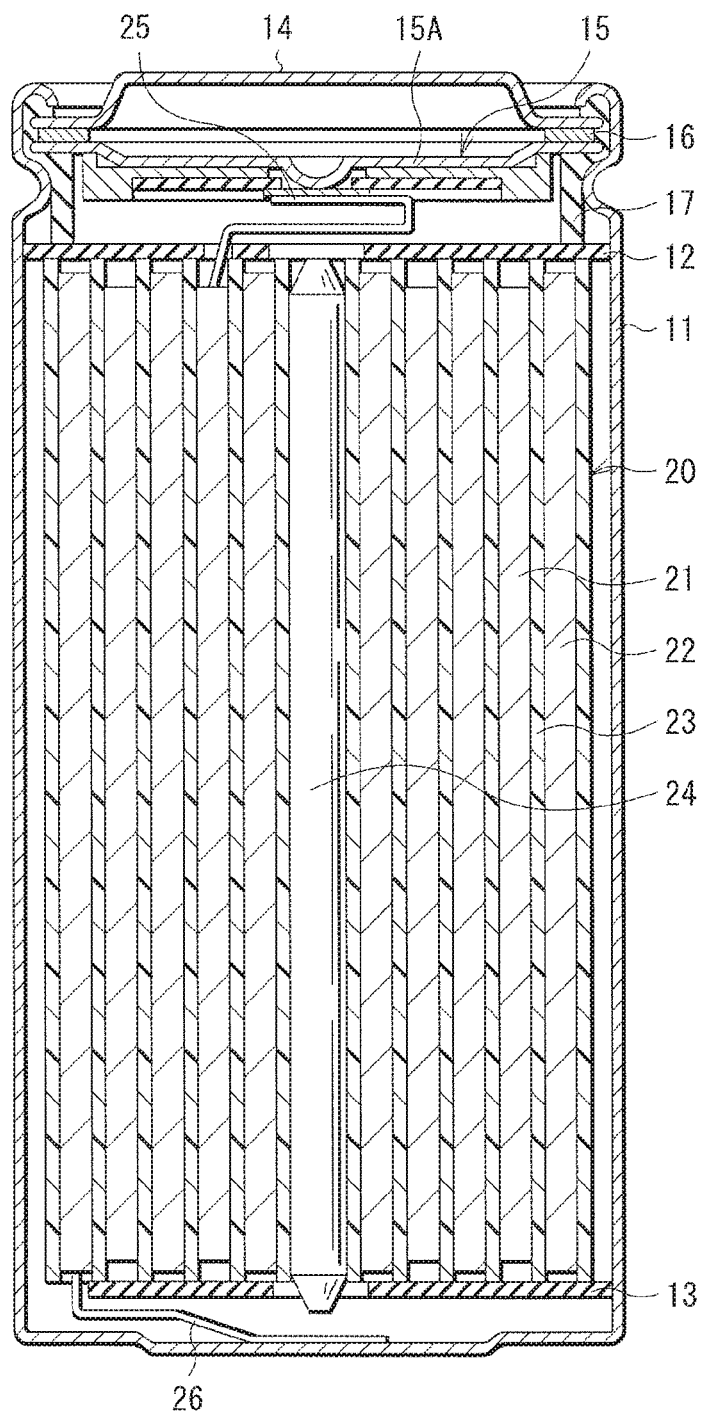

[FIG. 4]
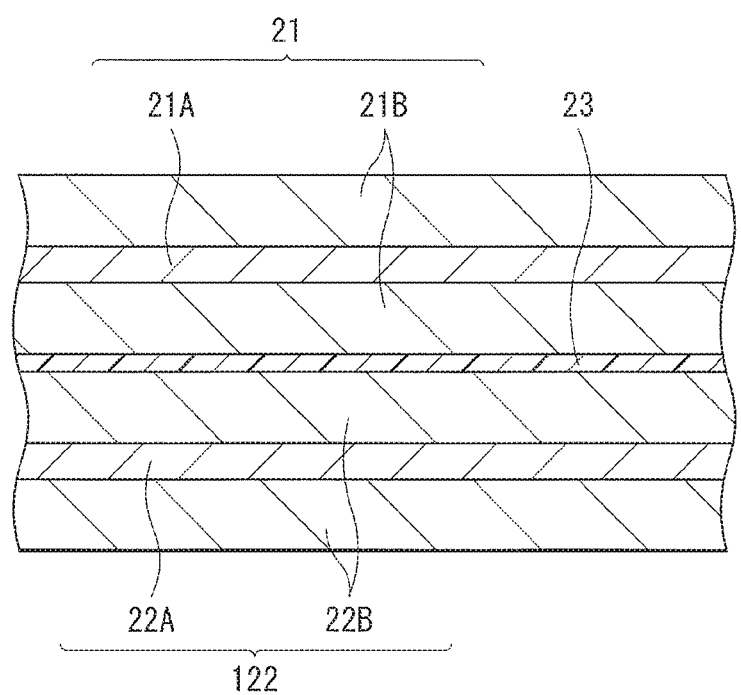

[FIG. 5]
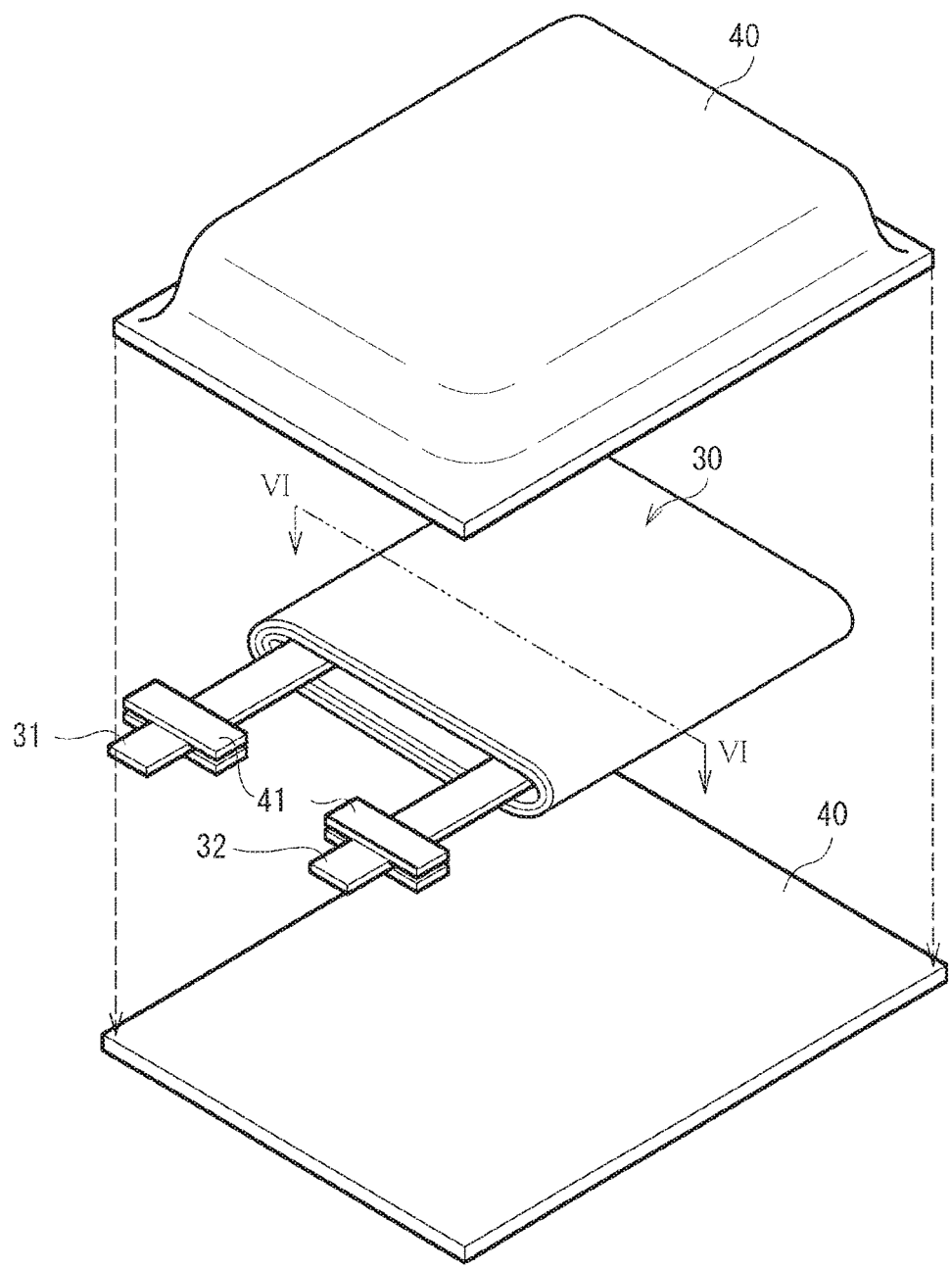

[FIG.6]
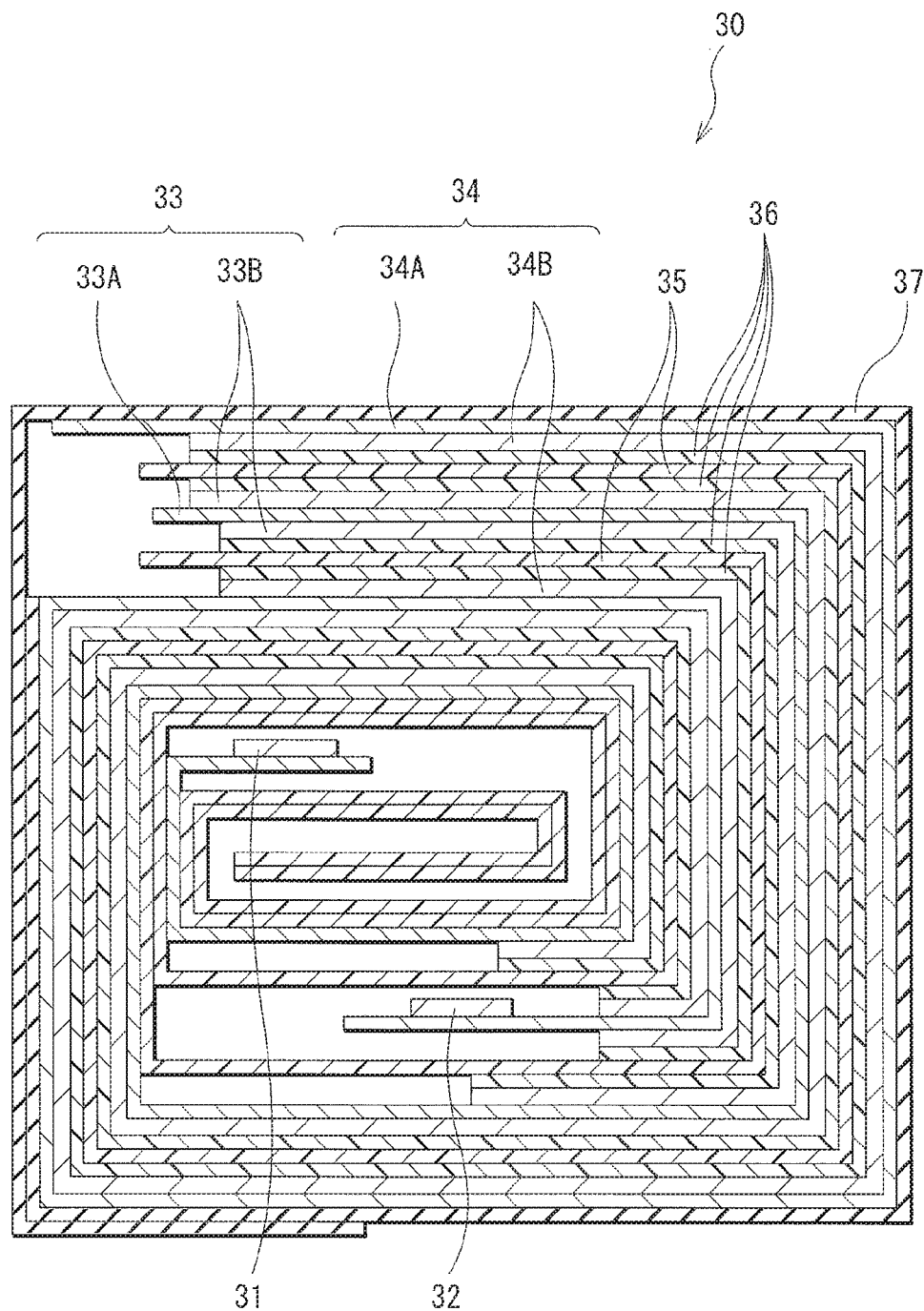

[FIG. 7]
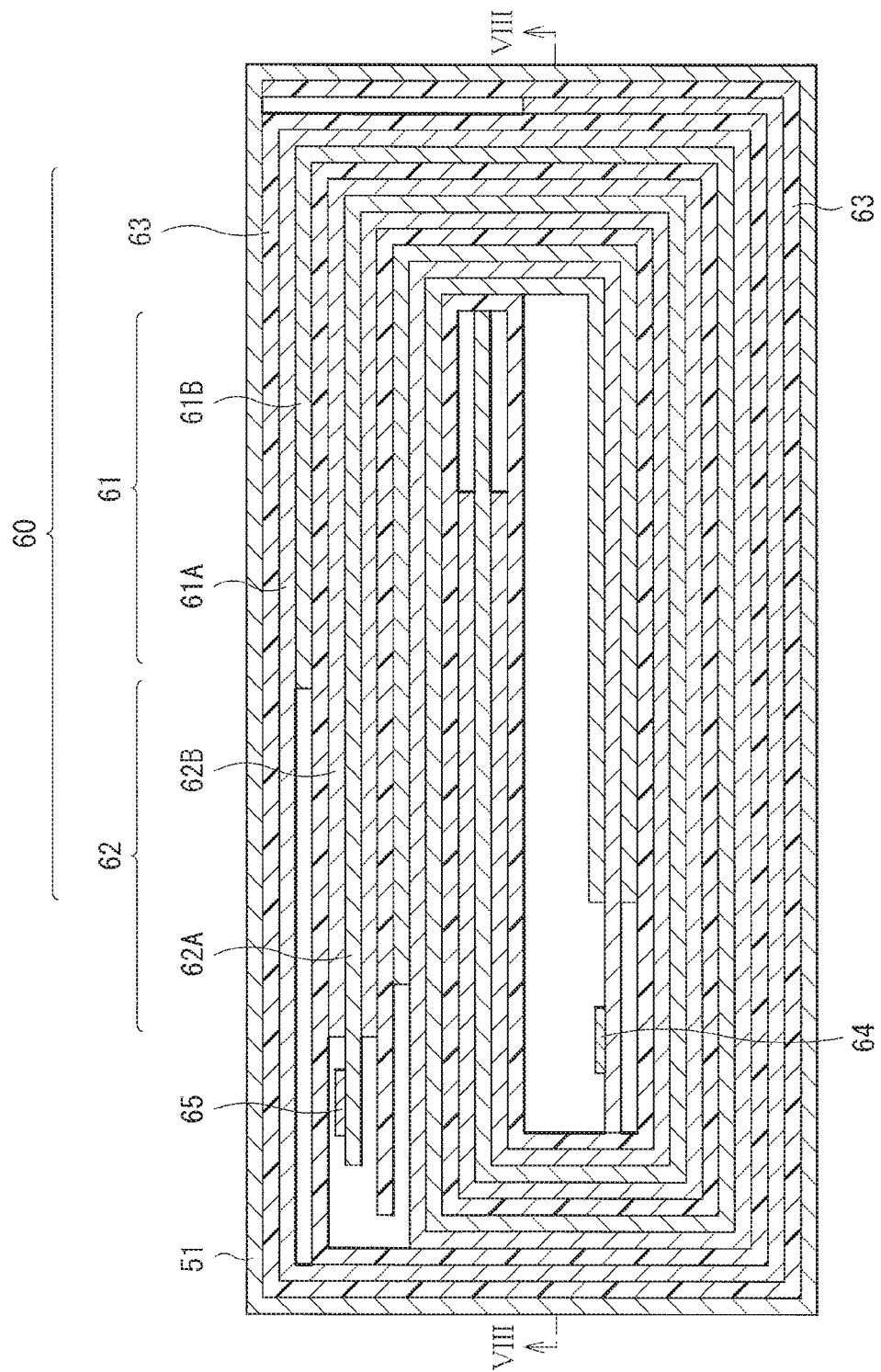

[FIG. 8]
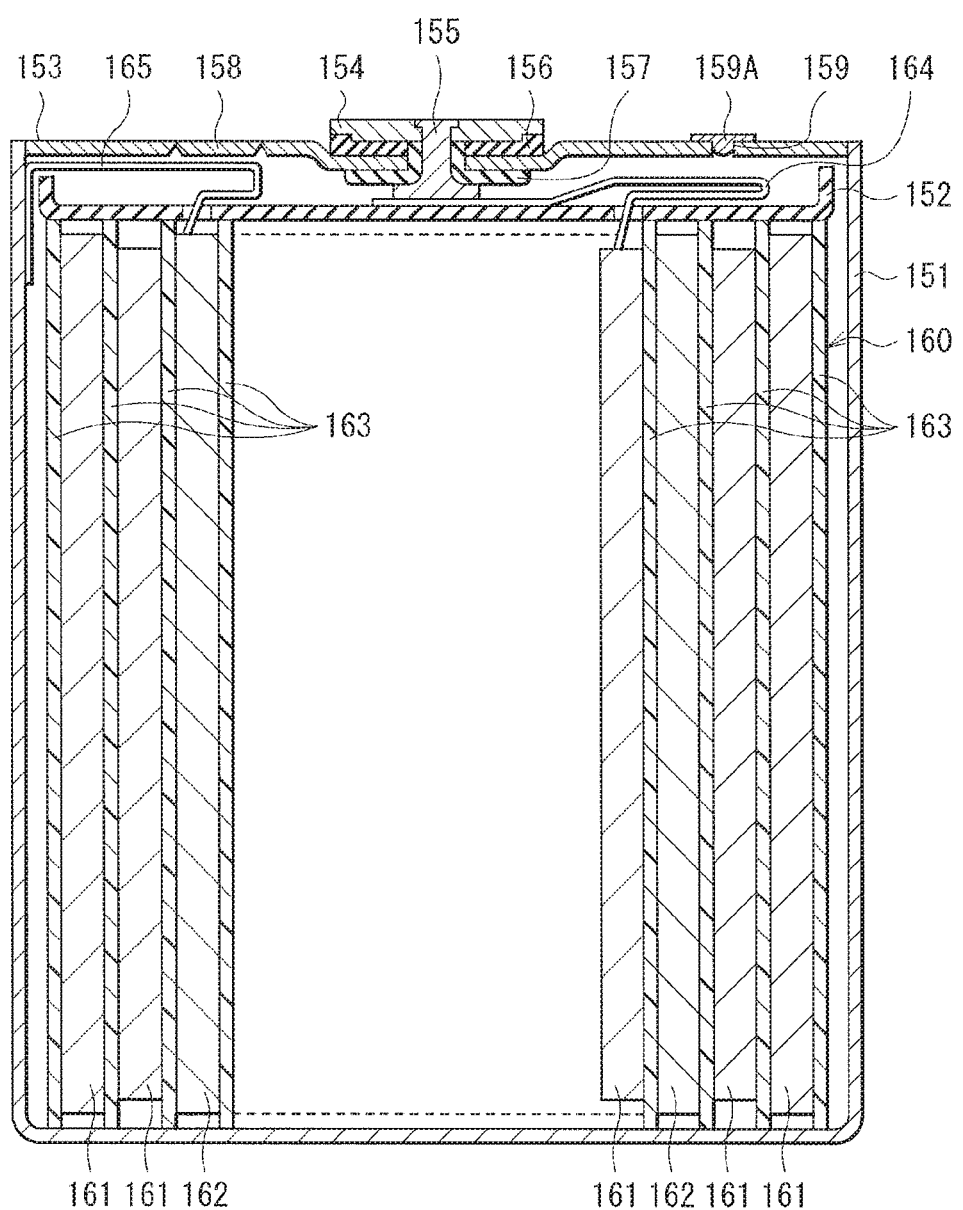

[FIG. 9]
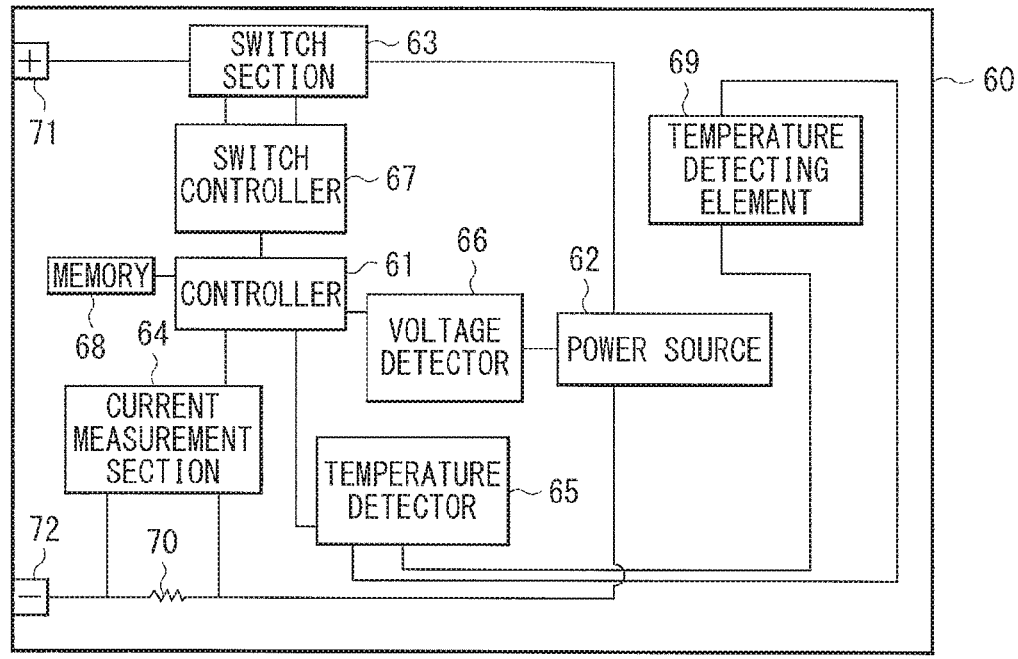
[FIG. 10]
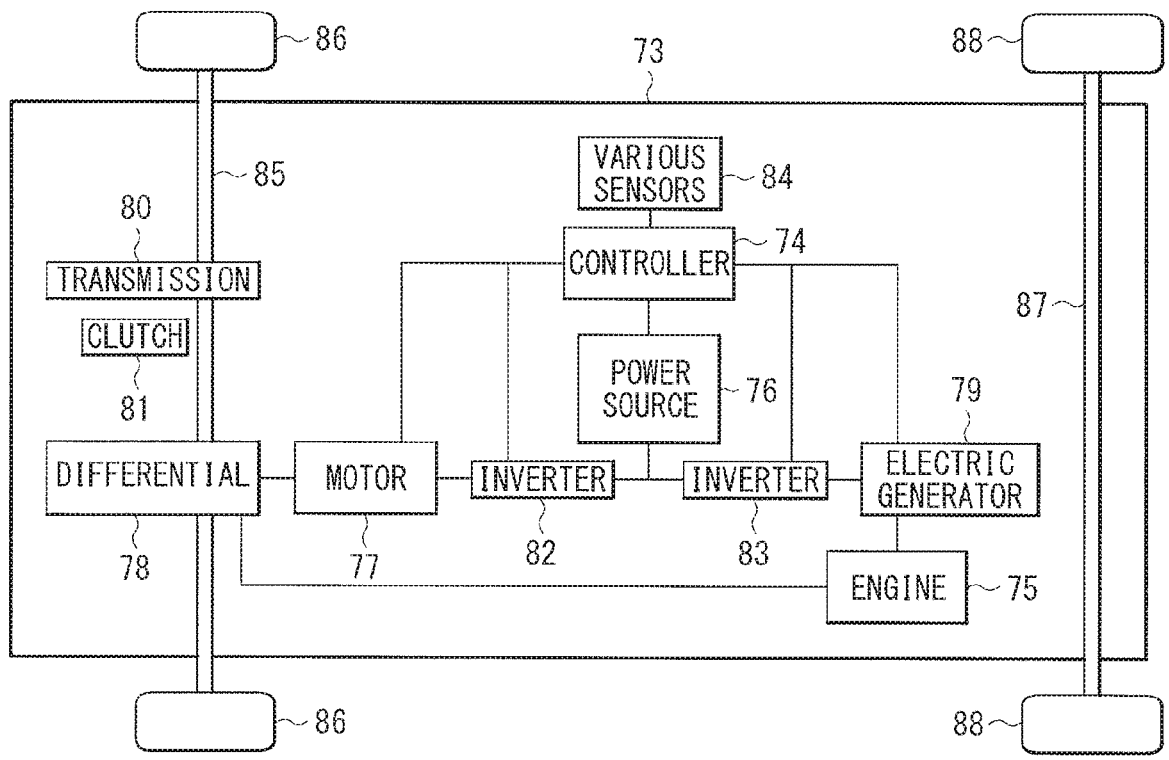

[ FIG. 11 ]
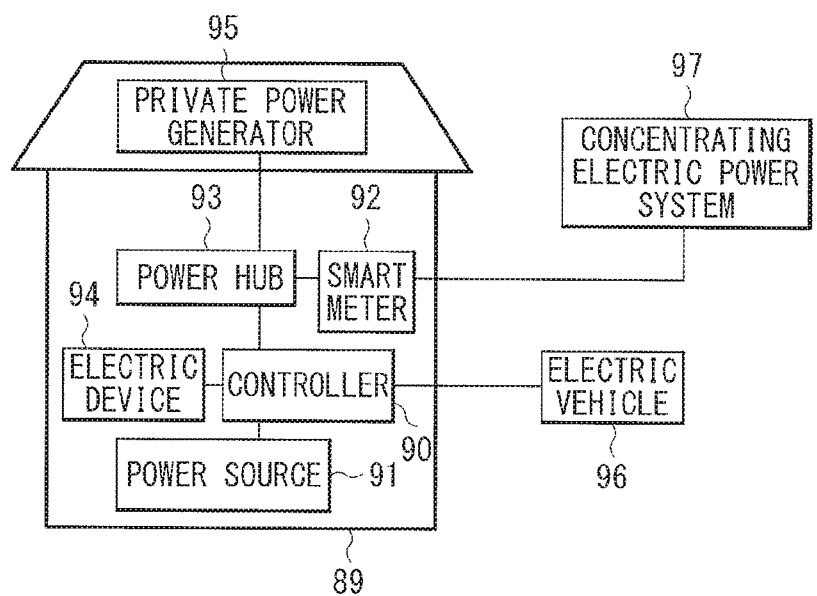
[ FIG. 12 ]
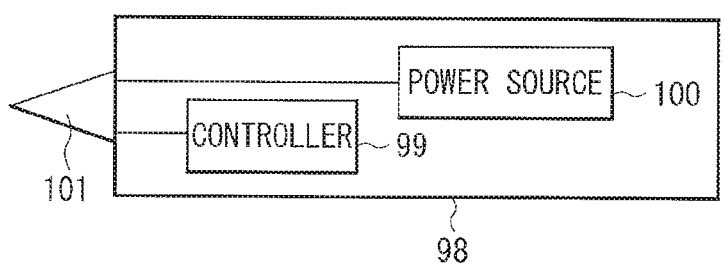

SECONDARY BATTERY-USE ANODE ACTIVE MATERIAL, SECONDARY BATTERY-USE ANODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

This application is a national stage application under 35 U.S.C. 371 and claims the benefit of PCT Application No. PCT/JP2015/068046 having an international filing date of 23 Jun. 2015, which designated the United States, which PCT application claimed the benefit of Japanese Patent Application No. 2014-147657 filed 18 July 2014, the disclosures pf which are incorporated herein by reference in their entirety.

TECHNICAL FIELD

The present technology relates to a secondary battery-use anode active material, to a secondary battery-use anode and a secondary battery that use such a secondary battery-use anode active material, and to a battery pack, an electric vehicle, an electric power storage system, an electric power tool, and an electronic apparatus that use the secondary battery.

BACKGROUND ART

In recent years, portable electronic apparatuses such as a video camera, a digital still camera, a mobile phone, or a notebook personal computer have been widely used, and it has been strongly demanded to further reduce size and weight of the electronic apparatuses and to achieve their longer lives. Accordingly, as electric power sources for the electronic apparatuses, batteries, in particular, compact and light-weight secondary batteries that make it possible to achieve high energy density have been developed.

Among them, a lithium-ion secondary battery utilizing insertion and extraction of lithium ions as charge-discharge reaction, a lithium-metal secondary battery utilizing precipitation and dissolution of lithium metal, or any other secondary battery have been greatly expected, because such secondary batteries achieve higher energy density than a lead battery and a nickel-cadmium battery.

Advantages of light weight and high energy density of the secondary battery are suitable for applications of automobiles such as an electric automobile and a hybrid automobile. Hence, recently, a research aiming at increased size and enhanced output power of the secondary battery has been also actively carried out.

Such a lithium-ion secondary battery includes an electrolytic solution along with a cathode and an anode. The anode includes an anode active material layer on an anode current collector, and the anode active material layer contains an anode active material that contributes to charge-discharge reaction. As the anode active material, a carbon material has been widely used however, use of silicon has been recently considered because a further increase in battery capacity has been desired. This is because a significant increase in the battery capacity may be expected since a theoretical capacity (4199 mAh/g) of silicon is much larger than a theoretical capacity (372 mAh/g) of graphite. In this case, not only a simple substance of silicon but also an alloy or compound of silicon has been considered.

However, when silicon is used as the anode active material, the battery capacity is increased, but some issues may arise. Specifically, the anode active material may be expanded and contracted intensively at the time of charge and discharge therefore, the anode active material is more likely to break up and crumble. Further, decomposition reaction of the electrolytic solution is more likely to occur due to high reactivity of the anode active material.

Accordingly, for a lithium-ion secondary battery using silicon as the anode active material, various considerations have been made to improve a variety of performance. For example, in PTL 1, a material in which a water-soluble rubber-based resin and pulverized-state PVDF (polyvinylidene fluoride) are added to the anode active material as a mixture binder is used as an anode mixture layer. In PTL 1, PVDF swells in an electrolytic solution to hold the electrolytic solution, which makes it possible to improve cycle characteristics of a cylindrical-type battery.

CITATION LIST

Patent Literature

[PTL 1] Japanese Unexamined Patent Application Publication No. 2008-243441

DISCLOSURE OF INVENTION

In PTL 1, however, no considerations have been made concerning interface control by coating of an anode active material of a laminated-type battery. In electrodes using water-soluble polymers, an effect of suppressing conductive path breakage or ion path breakage, etc. by forming a stable interface between active materials that follows expansion and contraction of the active materials in association with charge and discharge is desired. In particular, when active materials that are expanded and contracted greatly by charge and discharge, such as metal material-based active materials containing an element such as silicon (Si) or tin (Sn) are used, it is important to form a more flexible and stable active material interface or electrode interface.

Accordingly, it is desirable to provide a secondary battery-use anode active material, a secondary battery-use anode, a secondary battery, a battery pack, an electric vehicle, an electric power storage system, an electric power tool, and an electronic apparatus that make it possible to achieve superior battery characteristics.

A secondary battery-use anode active material according to an embodiment of the present technology includes a surface covered with one or a plurality of coatings containing one or both of polyvinylidene fluoride and a copolymer of polyvinylidene fluoride. Further, a secondary battery-use anode according to an embodiment of the present technology includes an anode current collector and an anode active material layer that is provided on the anode current collector and includes the above-described secondary battery-use anode active material. Moreover, a secondary battery according to an embodiment of the present technology includes a cathode, an anode, and an electrolytic solution, and the anode has a configuration similar to a configuration of the above-described secondary battery-use anode. Additionally, a battery pack, an electric vehicle, an electric power storage system, an electric power tool, and an electronic apparatus according to respective embodiments of the present technology each have a secondary battery that has a configuration similar to a configuration of the above-described secondary battery according to the embodiment of the present technology.

The coating referred to here is not particulate, and means that a dimension in a direction along a surface of the anode active material is sufficiently larger than a dimension in a thickness direction perpendicular to the surface of the anode active material.

According to the secondary battery-use anode active material, the secondary battery-use anode, and the secondary battery of the respective embodiments of the present technology, the surface of the anode active material is covered with one or more coatings containing one or both of polyvinylidene fluoride and a copolymer of polyvinylidene fluoride. Therefore, adhesibility between the anode active material and electrolytic solution is improved, and a stable interface following expansion and contraction of the active material in association with charge and discharge is formed between the anode active material and electrolytic solution. This makes it possible to achieve superior battery characteristics such as cycle characteristics. Moreover, in the battery pack, the electric vehicle, the electric power storage system, the electric power tool, and the electronic apparatus of the present technology, the similar effects are achievable. Note that effects described here are non-limiting. Effects achieved by the present disclosure may be one or more of effects described below.

BRIEF DESCRIPTION OF DRAWINGS

FIG. 1 is a cross-sectional view of a configuration of a secondary battery-use anode according to an embodiment of the present technology.

FIG. 2 is an enlarged conceptual diagram of part of an anode active material of an anode active material layer illustrated in FIG. 1.

FIG. 3 is a cross-sectional view of a configuration of a first secondary battery (of a cylindrical type) using the secondary battery-use anode according to the embodiment of the present technology.

FIG. 4 is an enlarged cross-sectional view of part of a spirally wound electrode body illustrated in FIG. 3.

FIG. 5 is a perspective view of a configuration of a second secondary battery (of a laminated film type) using the secondary battery-use anode according to the embodiment of the present technology.

FIG. 6 is a cross-sectional view of a spirally wound electrode body taken along a line VI-VI illustrated in FIG. 5.

FIG. 7 is a cross-sectional view of a configuration of a third secondary battery (of a square type) using a secondary battery-use anode according to an embodiment of the present technology.

FIG. 8 is a cross-sectional view of a configuration of a spirally wound electrode body taken along a line illustrated in FIG. 7.

FIG. 9 is a block diagram illustrating a configuration of an application example (a battery pack) of the secondary battery.

FIG. 10 is a block diagram illustrating a configuration of an application example (an electric vehicle) of the secondary battery.

FIG. 11 is a block diagram illustrating a configuration of an application example (an electric power storage system) of the secondary battery.

FIG. 12 is a block diagram illustrating a configuration of an application example (an electric power tool) of the secondary battery.

MODES FOR CARRYING OUT THE INVENTION

Hereinafter, some embodiments of the present technology will be described in detail with reference to the drawings. It is to be noted that the description will be provided in the following order.
1. Anode Including Secondary battery-use anode active material
2. Secondary Battery Using Secondary battery-use anode
   2-1. Lithium-Ion Secondary Battery (Cylindrical Type)
   2-2. Lithium-Ion Secondary Battery (Laminated Film Type)
   2-3. Lithium-Ion Secondary Battery (Square Type)
3. Applications of Secondary Battery
   3-1. Battery Pack
   3-2. Electric Vehicle
   3-3. Electric Power Storage System
   3-4. Electric Power Tool
4. Experimental Examples
   (1. Anode Including Secondary Battery-Use Anode Active Material)

First, the description will be provided on a secondary battery-use anode 10 according to an embodiment of the present technology (hereinafter simply referred to as an "anode" or an "anode of the present technology". The anode 10 to be described herein may be used in, for example, a secondary battery such as a lithium-ion secondary battery.

[Configuration of Anode]

FIG. 1 illustrates a cross-sectional configuration of the anode 10. The anode 10 includes an anode current collector 1 and an anode active material layer 2.

[Anode Current Collector]

The anode current collector 1 may include, for example, one or more of conductive materials such as copper (Cu), nickel (Ni), and stainless steel. A surface of the anode current collector 1 may be preferably roughened. This makes it possible to improve adhesibility of the anode active material layer 2 with respect to the anode current collector 1 by a so-called anchor effect. In this case, it is enough that the surface of the anode current collector 1 at least in a region facing the anode active material layer 2 is roughened. Non-limiting examples of a roughening method may include a method of forming fine particles with use of electrolytic treatment. Through the electrolytic treatment, fine particles are formed on the surface of the anode current collector 1 in an electrolytic bath by an electrolytic method to make the surface of the anode current collector 1 rough. A copper foil fabricated by the electrolytic method is generally called "electrolytic copper foil".

[Anode Active Material Layer]

The anode active material layer 2 may be provided on a single surface or both surfaces of the anode current collector 1. It is to be noted that FIG. 1 illustrates a case where the anode active material layer 2 is provided on both surfaces of the anode current collector 1.

The anode active material layer 2 includes an anode active material and an anode binder. It is to be noted that the anode active material layer 2 may further include one or more of other materials such as an anode conductor.

It is to be noted that the anode active material layer 2 may be formed, for example, by one or more of a coating method and any other methods. The coating method may be, for example, a method where a solution in which a particulate (powder) anode active material, and an anode binder or any other material are dispersed in a solvent (for example, an organic solvent) is applied onto the anode current collector 1.

The anode active material includes one or more of anode materials that is able to insert and extract an electrode reactant. The "electrode reactant" is a material substantially related to electrode reaction, and the electrode reactant in a case where a battery capacity is obtainable by use of insertion and extraction of lithium (Li) is lithium.

The anode material may be, for example, one or more of carbon materials. The carbon material causes an extremely-small change in a crystal structure thereof when the electrode reactive material is inserted or extracted, which stably achieves high energy density. Further, the carbon material also serves as the anode conductor, which improves conductivity of the anode active material layer 2.

Non-limiting examples of the carbon material may include graphitizable carbon, non-graphitizable carbon, and graphite. It is to be noted that a spacing of (002) plane in the non-graphitizable carbon may be preferably 0.37 inn or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Non-limiting examples of the cokes may include pitch coke, needle coke, and petroleum coke. The organic polymer compound fired body is a material that is obtained by firing (carbonizing) a polymer compound such as phenol resin and furan resin at appropriate temperature. Other than the materials mentioned above, the carbon material may be low crystalline carbon that is subjected to a heat treatment at temperature of about 1000° C. or lower, or may be amorphous carbon. It is to be noted that a shape of the carbon material may be any of a fibrous shape, a spherical shape, a granular shape, and a scale-like shape.

Moreover, the anode material may be, for example, a material (a metal-based material) that contains one or more of metal elements and metalloid elements as constituent elements. This makes it possible to achieve high energy density.

The metal-based material may be any of a simple substance, an alloy, or a compound, may be two or more thereof, or may have one or more phases thereof at least in part. It is to be noted that the "alloy" also encompasses a material that contains one or more metal elements and one or more metalloid elements, in addition to a material that is configured of two or more metal elements. Further, the "alloy" may contain a nonmetallic element. Non-limiting examples of a structure of the metal-based material may include a solid solution, a eutectic crystal (a eutectic mixture), an intermetallic compound, and a structure in which two or more thereof coexist.

The metal elements and the metalloid elements described above may be, for example, one or more of metal elements and metalloid elements that are able to form an alloy with the electrode reactant. Non-limiting specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (HO, zirconium (Zr), yttrium (Y), palladium (Pd), and platinum (Pt).

In particular, silicon, tin, or both may be preferable. Silicon and tin have superior ability to insert and extract the electrode reactant, and therefore achieve remarkably high energy density.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The simple substance described herein merely refers to a simple substance in a general sense (in which a small amount of impurity may be contained), and does not necessarily refer to a simple substance having a purity of 100%.

The alloy of silicon may contain, for example, one or more of elements such as tin, nickel, copper, iron (Fe), cobalt (Co), manganese (Mn), zinc, indium, silver, titanium (Ti), germanium, bismuth, antimony (Sb), and chromium (Cr), as constituent elements other than silicon. The compound of silicon may contain, for example, one or more of elements such as carbon (C) and oxygen (O), as constituent elements other than silicon. It is to be noted that the compound of silicon may contain, for example, one or more of the elements described related to the alloy of silicon, as constituent elements other than silicon.

Non-limiting specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and LiSiO. It is to be noted that "v" in $SiO_v$, may be in a range of $0.2<v<1.4$.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described related to the alloy of tin, as constituent elements other than tin.

Non-limiting specific examples of the alloy of tin and the compound of tin may include $SnO_w$ ($0<w\leq2$), $SnSiO_3$, LiSnO, and $Mg_2Sn$.

In particular, the material that contains tin (a first constituent element) as a constituent element may be preferably, for example, a material that contains a second constituent element and a third constituent element together with tin. The second constituent element may include, for example, one or more of elements such as cobalt, iron, magnesium, titanium, vanadium (V), chromium, manganese, nickel, copper, zinc, gallium (Ga), zirconium, niobium (Nb), molybdenum (Mo), silver, indium, cesium (Ce), hafnium (Hf), tantalum (Ta), tungsten (W), bismuth, and silicon. The third constituent element may include, for example, one or more of elements such as boron, carbon, aluminum, and phosphorus (P). The Sn-containing material containing the second constituent element and the third constituent element makes it possible to achieve, for example, high battery capacity and superior cycle characteristics.

In particular, a material (a SnCoC-containing material) that contains tin, cobalt, and carbon as constituent elements may be preferable. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon, and such a phase may be preferably low crystalline or amorphous. This phase is a reaction phase that is able to react with the electrode reactant, and therefore existence of the reaction phase results in achievement of superior characteristics. A half width (a diffraction angle 2θ) of a diffraction peak obtained by X-ray diffraction of this reaction phase may be preferably 1° or larger in a case where a CuKα ray is used as a specific X-ray, and an insertion rate is 1°/min. This makes it possible to insert and extract the electrode reactant more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with the electrode reactant makes it possible to easily determine whether the diffraction peak obtained by the X-ray diffraction corresponds to the reaction phase that is able to react with the electrode reactant. For example, if a position of the diffraction peak after the electrochemical reaction with the electrode reactant is changed from the position of the diffraction peak before the electrochemical reaction with the electrode reactant, the obtained diffraction peak corresponds to the reaction phase that is able to react with the electrode reactant. In this case, for example, the diffraction peak of the low-crystalline reaction phase or the amorphous reaction phase is seen in a range of 2θ that is from 20° to 50° both inclusive. Such a reaction phase may include, for example, the respective constituent elements mentioned above, and it may be considered that such a reaction phase has become low crystalline or amorphous mainly because of existence of carbon.

In the SnCoC-containing material, part or all of carbon that is the constituent element thereof may be preferably bound to a metal element or a metalloid element that is another constituent element thereof. Binding part or all of carbon suppresses cohesion or crystallization of for example, tin. It is possible to confirm a binding state of the elements, for example, by XPS. In a commercially-available apparatus, for example, an Al-Kα ray or a Mg-Kα ray may be used as a soft X-ray. In a case in which part or all of carbon is bound to a metal element, a metalloid element, or another element, a peak of a synthetic wave of 1s orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may further contain, for example, one or more of silicon, iron, nickel, chromium, indium, niobium, germanium, titanium, molybdenum, aluminum, phosphorus, gallium, bismuth, and any other elements, as constituent elements, in addition to tin, cobalt, and carbon.

Other than the SnCoC-containing material, a material SnCoFeC-containing material) that contains tin, cobalt, iron, and carbon as constituent elements may be also preferable. Any composition of the SnCoFeC-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the anode material may be, for example, one or more of a metal oxide, a polymer compound, or any other materials. Non-limiting examples of the metal oxide may include iron oxide, ruthenium oxide, and molybdenum oxide. Non-limiting examples of the polymer compound may include polyacetylene, polyaniline, and polypyrrole.

In particular, the anode material may preferably include both the carbon material and the metal-based material for the following reason.

The metal-based material, in particular, the material containing one or both of silicon and tin as constituent elements has a concern that such a material is easily and radically expanded or contracted at the time of reaction with an electrode, whereas such a material has an advantage of high theoretical capacity. In contrast, the carbon material has an advantage that the carbon material is less prone to be expanded or contracted at the time of reaction with the electrode, whereas the carbon material has a concern of low theoretical capacity. Hence, using both of the carbon material and the metal-based material makes it possible to suppress expansion and contraction at the time of reaction with the electrode while achieving high theoretical capacity (in other words, high battery capacity).

In a case where the anode material contains both the carbon material and the metal-based material, a mixture ratio of the carbon material and the metal-based material is not limited specifically. In particular, a content rate of the metal-based material to the total of the carbon material and the metal-based material may be preferably 1 mass % or more. When the content rate is less than 1 mass %, the above-described advantages of the metal-based material may be less likely to be leveraged.

In the present embodiment, as illustrated in FIG. 2, the anode active material may take a particulate form, for example (which is illustrated as an anode active material particle 3 in FIG. 2), and part or all of the surface thereof may be covered with one or more coatings 4 that contain one or both of polyvinylidene fluoride (PVDF) and a copolymer thereof. The coating 4 functions as an anode binder.

The copolymer of polyvinylidene fluoride may be, for example, a copolymer of vinylidene fluoride and one or more of monomethyl maleate (MMM), hexafluoropropylene (HFP), tetrafluoroethylene (TFE), and chlorotrifluoroethylene (CTFE). In other words, non-limiting examples of the copolymer may include a copolymer of vinylidene fluoride and monomethyl maleate; a copolymer of vinylidene fluoride and hexafluoropropylene; a copolymer of vinylidene fluoride and tetrafluoroethylene; a copolymer of vinylidene fluoride and chlorotrifluoroethylene; a copolymer of vinylidene fluoride, monomethyl maleate, and hexafluoropropylene; a copolymer of vinylidene fluoride, hexafluoropropylene, and tetrafluoroethylene; a copolymer of vinylidene fluoride, hexafluoropropylene, and chlorotrifluoroethylene; and any other copolymers in which other unsaturated ethylene monomer is further copolymerized with the above-described copolymers.

The coating 4 may further contain a water-soluble polymer. Examples of the water-soluble polymer referred to here may include carboxymethyl cellulose (CMC), polyacrylic acid, polyacrylate, polyvinyl alcohol, polyacrylamide, and polyethylene oxide.

For the anode active material particle 3, only a portion of the surface thereof instead of the whole surface thereof may be covered with the coating 4. Further, a plurality of coatings 4 may be distributed discretely to widely cover the surface of the anode active material particle 3.

As the anode binder, for example, a synthetic rubber or any other material may be applicable in addition to the polyvinylidene fluoride and a copolymer thereof as mentioned above, and the above-described water-soluble polymer. Non-limiting examples of the synthetic rubber may include styrene-butadiene-based rubber, fluorine-based rubber, and ethylene propylene diene.

A content rate of the anode binder to the total of the anode active material and the anode binder is not specifically limited; however, in particular, the content rate may be preferably from 1 mass % to 10 mass % both inclusive. The binding performance becomes insufficient if the content rate is less than about 1 mass %, and therefore the anode active material layer 2 is likely to be damaged without resulting from internal stress described above. In contrast, the amount of the anode active material decreases if the content rate is greater than 10 mass %, and therefore a lithium insertion amount per unit weight is likely to decrease in the anode active material layer 2.

The anode conductor may contain, for example, one or more of carbon materials and other materials. Non-limiting examples of the carbon material may include graphite, carbon black, acetylene black, and Ketjen black. It is to be noted that the anode conductor may be alternatively any other material such as a metal material and a conductive polymer, as long as the anode conductor is a material having conductivity.

[Method of Manufacturing Anode]

The anode 10 may be manufactured by the following procedure, for example.

First, the above-described anode active material is dispersed in water in which one or both of PVDF and the copolymer thereof, and the anode conductor are added to prepare paste anode mixture slurry. Subsequently, the above-described anode mixture slurry is applied onto both surfaces of the anode current collector 1, and thereafter dried to form an active material preparatory layer. The active material preparatory layer is a preliminary preparation layer for formation of the anode active material layer 2, it is to be noted that drying may be carried out at a temperature of about 80° C., for example.

Thereafter, the whole active material preparatory layer is heated at a temperature equal to or higher than a melting point of PVDF and the copolymer thereof (for example, a temperature in a range of about 180° C. to about 200° C.). Thus, PVDF and the copolymer thereof are melted to be fluidized, and coat the surface of the anode active material. As a result, the anode active material layers 2 are formed on both surfaces of the anode current collector 1, leading to completion of the anode 10.

[Functions and Effects of Secondary Battery-Use Anode]

According to the anode 10, one or more coatings containing one or both of polyvinylidene fluoride and the copolymer thereof are provided on the surface of the anode active material; therefore adhesibility between the anode active material and electrolytic solution is improved when the anode 10 is used for a secondary battery, which makes it possible to form a stable interface following expansion and contraction of the anode active material in association with charge and discharge. As a result, it is possible to suppress deterioration in battery characteristics such as cycle characteristics caused by lithium precipitation, breakage of a conductive path, or any other factor.

(2. Secondary Battery Using Secondary Battery-Use Anode)

Next, the description will be provided on a secondary battery using the anode according to the present technology, (2-1. Lithium-Ion Secondary Battery (Cylindrical Type))

FIG. 3 and FIG. 4 each illustrate a cross-sectional configuration of a secondary battery, and FIG. 4 enlarges a portion of a spirally wound electrode body 20 illustrated in FIG. 3.

[Configuration of Secondary Battery]

The secondary battery described here is a secondary battery (a lithium-ion secondary battery) in which a capacity of an anode is obtained by insertion and extraction of lithium that is an electrode reactant.

The secondary battery may be, for example, a so-called cylindrical type secondary battery, and may contain the spirally wound electrode body 20 and a pair of insulating plates 12 and 13 inside a battery can 11 that has a substantially hollow cylindrical shape. In the spirally wound electrode body 20, for example, a cathode 21 and the anode 22 may be stacked with a separator 23 in between and may be spirally wound.

The battery can 11 has a hollow structure in which one end thereof is closed and the other end thereof is open, and may be made of, for example, iron, aluminum, an alloy thereof, or any other material. It is to be noted that a surface of the battery can 11 may be plated with nickel or any other material. The pair of insulating plates 12 and 13 is disposed to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 are swaged with a gasket 17, by which the battery can 11 is hermetically sealed. The battery cover 14 may be made of, for example, a material similar to the material of the battery can 11. Each of the safety valve mechanism 15 and the PTC device 16 is provided on the inner side of the battery cover 14, and the safety valve mechanism 15 is electrically coupled to the battery cover 14 via the PTC device 16. In the safety valve mechanism 15, when an internal pressure of the battery can 11 reaches a certain level or higher as a result of internal short circuit, heating from outside, or any other reason, a disk plate 15A inverts. This cut electric connection between the battery cover 14 and the spirally wound electrode body 20. The PTC device 16 prevents abnormal heat generation resulting from a large current, and a resistance thereof increases with an increase in temperature. The gasket 17 may be made of, for example, an insulating material, and a surface of the gasket 17 may be coated with asphalt.

For example, a center pin 24 may be inserted in the center of the spirally wound electrode body 20. However, the center pin 24 may not be inserted in the center of the spirally wound electrode body 20. A cathode lead 25 made of, for example, a conductive material such as aluminum may be coupled to the cathode 21, and an anode lead 26 made of, for example, a conductive material such as nickel may be coupled to the anode 22. For example, the cathode lead 25 may be attached to the safety valve mechanism 15 by welding or any other method, and may be electrically coupled to the battery cover 14. For example, the anode lead 26 may be attached to the battery can 11 by welding or any other method, and may be electrically coupled to the battery can 11.

[Cathode]

The cathode 21 includes a cathode active material layer 21B on a single surface or both surfaces of a cathode current collector 21A. The cathode current collector 21A may be made of, for example, a conductive material such as aluminum, nickel, or stainless steel.

The cathode active material layer 21B includes, as a cathode active material, one or more of cathode materials that has ability to insert and extract lithium. It is to be noted that the cathode active material layer 21B may further include one or more of other materials such as a cathode binder and a cathode conductor.

The cathode material may be preferably a lithium-containing compound, which makes it possible to achieve high energy density. Non-limiting examples of the lithium-containing compound may include a lithium transition metal composite oxide, a lithium transition metal phosphate compound, or any other compound. The lithium transition metal composite oxide refers to an oxide that includes lithium and one or more of transition-metal elements as constituent elements, and the lithium transition metal phosphate compound refers to a phosphate compound that includes lithium and one or more of transition-metal elements as constituent elements. In particular, the transition-metal elements may be preferably one or more of cobalt, nickel, manganese, iron, or any other elements, which make it possible to achieve a higher voltage. A chemical formula of the lithium-containing compound may be represented by $Li_xM1O_2$ or $Li_yM2PO_4$, for example. In the chemical formulas, M1 and M2 each are one or more of the transition-metal elements. Values of "x" and "y" vary depending on charge and discharge states, but may be, for example, $0.05 \leq x \leq 1.10$ and $0.05 \leq y \leq 1.10$.

Non-limiting specific examples of the lithium transition metal composite oxide may include LiCoO2, LiNiO2, and a lithium-nickel-based composite oxide represented by the following formula (20). Non-limiting Specific examples of lithium transition metal phosphate compound may include LiFePO4 and LiFe1□uMnuPO4 (where u<1). These lithium transition metal composite oxides and these lithium transition metal phosphate compounds make it possible to achieve higher battery capacity and to achieve superior cycle characteristics.

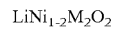

(20)

where M is one or more of cobalt, manganese, iron, aluminum, vanadium, tin, magnesium, titanium, strontium (Sr), calcium (Ca), zirconium, molybdenum, technetium (Tc), ruthenium (Ru), tantalum, tungsten, rhenium (Re), ytterbium (Yb), copper, zinc, barium (Ba), boron, chromium, silicon, gallium, phosphorus, antimony, and niobium, and "z" satisfies $0.005<z<0.5$.

Other than the materials mentioned above, the cathode material may be, for example, one or more of an oxide, a disulfide, a chalcogenide, a conductive polymer, or any other material. Non-limiting examples of the oxide may include titanium oxide, vanadium oxide, and manganese dioxide. Non-limiting examples of the disulfide may include titanium disulfide and molybdenum sulfide. Non-limiting examples of the chalcogenide may include niobium selenide. Non-limiting examples of the conductive polymer may include sulfur, polyaniline, and polythiophene. However, the cathode material may be a material other than the materials mentioned above.

The cathode binder may include, for example, one or more of synthetic rubbers, polymer materials, and any other materials. Non-limiting examples of the synthetic rubber may include a styrene-butadiene-based rubber, a fluorine-based rubber, and ethylene propylene diene. Non-limiting examples of the polymer material may include polyvinylidene fluoride and polyimide. A crystalline structure of polyvinylidene fluoride that is in use as a polymer material is not limited specifically.

The cathode conductor may include, for example, one or more of carbon materials and any other material. Non-limiting examples of the carbon materials may include graphite, carbon black, acetylene black, and Ketjen black. It is to be noted that the cathode conductor may be a metal material, a conductive polymer, or any other material, as long as the cathode conductor is a material having conductivity.

[Anode]

The anode 22 includes an anode active material layer 22B on a single surface or both surfaces of an anode current collector 22A. The configurations of the anode current collector and the anode active material layer 22B are similar to those of the anode current collector 1 and the anode active material layer 2, respectively.

It is to be noted that chargeable capacity of the anode material may be preferably larger than discharge capacity of the cathode 21 to prevent lithium metal from being unintentionally precipitated on the anode 22 in the middle of charge. In other words, electrochemical equivalent of the anode material that has ability to insert and extract lithium may be preferably larger than electrochemical equivalent of the cathode 21.

In the secondary battery, in a case where an open circuit voltage (that is, a battery voltage) in a completely-charged state is 4.3 V or higher, an extraction amount of lithium per unit mass is larger than that in a case where the open circuit voltage is 4.2 V, even if the same cathode active material is used. Hence, amounts of the cathode active material and the anode active material are adjusted in accordance therewith to achieve high energy density.

[Separator]

A separator 23 separates the cathode 21 from the anode 22, and passes lithium ions therethrough while preventing current short circuit that results from contact between the cathode 21 and the anode 22. The separator 23 may be, for example, a porous film that is made of synthetic resin, ceramics, or any other material. The separator 23 may be a laminated film in which two or more porous films are laminated. Non-limiting examples of the synthetic resin may include polytetrafluoroethylene, polypropylene, and polyethylene.

In particular, the separator 23 may include, for example, the above-described porous film (a base material layer), and a polymer compound layer provided on a single surface or both surfaces of the base material layer. This allows for an improvement in adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base material layer is impregnated. Accordingly, resistance is less prone to increase even if charge and discharge are repeated, and battery swollenness is suppressed.

The polymer compound layer may include, for example, a polymer material such as polyvinylidene fluoride. Such a polymer material is superior in physical strength and electrochemically stable. However, the polymer material may be a material other than polyvinylidene fluoride. When forming the polymer compound layer, for example, a solution in which the polymer material is dissolved is prepared, and thereafter, the solution is applied onto the base material layer, and the base material layer is subsequently dried. Alternatively, the base material layer may be immersed in the solution and may be subsequently dried.

[Electrolytic Solution]

The separator 23 is impregnated with the electrolytic solution that is a liquid electrolyte. This electrolytic solution contains a solvent and electrolytic salt, and may further contain one or more of other materials such as an additive.

The solvent includes one or more of non-aqueous solvents such as an organic solvent. The electrolytic solution containing the non-aqueous solvents is a so-called non-aqueous electrolytic solution.

Non-limiting examples of the non-aqueous solvent may include a cyclic ester carbonate, a chain ester carbonate, lactone, a chain carboxylic ester, and nitrile. Such nonaqueous solvents make it possible to achieve, for example, superior battery capacity, superior cycle characteristics, and superior storage characteristics. Non-limiting examples of the cyclic ester carbonate may include ethylene carbonate, propylene carbonate, and butylene carbonate. Non-limiting examples of the chain ester carbonate may include dimethyl carbonate, diethyl carbonate, ethyl methyl carbonate, and methylpropyl carbonate. Non-limiting examples of the lactone may include γ-butyrolactone and γ-valerolactone. Non-limiting examples of the chain carboxylic ester may include methyl acetate, ethyl acetate, methyl propionate, ethyl propionate, methyl butyrate, methyl isobutyrate, methyl trimethyl acetate, and ethyl trimethylacetate. Examples of the nitrile may include acetonitrile, glutaronitrile, adiponitrile, methoxyacetonitrile, and 3-methoxypropionitrile.

Other than the materials mentioned above, non-limiting examples of the non-aqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethylsulfoxide. These nonaqueous solvents make it possible to achieve similar advantages.

Above all, one or more of ethylene carbonate, propylene carbonate, dimethyl carbonate, diethyl carbonate, and ethyl methyl carbonate may be preferable. These materials make it possible to achieve, for example, further superior battery capacity, further superior cycle characteristics, and further superior storage characteristics. In this case, a combination of a high-viscosity (high dielectric constant) solvent (having, for example, specific dielectric constant $\varepsilon \geq 30$) and a low-viscosity solvent (having, for example, viscosity≤1 mPa·s) may be more preferable. Non-limiting examples of the high-viscosity solvent may include ethylene carbonate and propylene carbonate, and non-limiting examples of the low-viscosity solvent may include dimethyl carbonate, ethylmethyl carbonate, and diethyl carbonate. The combination allows for an improvement in the dissociation property of the electrolyte salt and ion mobility.

In particular, the solvent may contain one or more of an unsaturated cyclic ester carbonate, a halogenated ester carbonate, sultone (a cyclic ester sulfonate), and an acid anhydride, or any other material. This allows for an improvement in chemical stability of the electrolytic solution. The unsaturated cyclic ester carbonate is cyclic ester carbonate having one or more unsaturated bonds (carbon-carbon double bonds). Non-limiting examples of the unsaturated cyclic ester carbonate may include vinylene carbonate, vinyl ethylene carbonate, and methylene ethylene carbonate. The halogenated ester carbonate is a cyclic ester carbonate having one or more halogens as constituent elements or a chain ester carbonate having one or more halogens as constituent elements. Non-limiting examples of the cyclic halogenated ester carbonate may include 4-fluoro-1,3-dioxolane-2-one and 4,5-difluoro-1,3-dioxolane-2-one. Non-limiting examples of the chain halogenated ester carbonate may include fluoromethyl methyl carbonate, bis(fluoromethyl) carbonate, and difluoromethyl methyl carbonate. Non-limiting examples of the sultone may include propane sultone and propene sultone. Non-limiting examples of the acid anhydride may include a succinic anhydride, an ethane disulfonic anhydride, and a sulfobenzoic anhydride. However, the solvent is not limited to the above-described materials, and may be a material other than the above-described materials.

The electrolyte salt may contain, for example, one or more of salts such as lithium salt. However, the electrolyte salt may contain, for example, a salt other than the lithium salt. Non-limiting examples of the other salt may include a light metal salt other than the lithium salt.

Non-limiting examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). These lithium salts make it possible to achieve, for example, superior battery capacity, superior cycle characteristics, and superior storage characteristics.

In particular, one or more of $LiPF_6$, $LiBF_4$, $LiClO_4$, and $LiAsF_6$ may be preferable, and $LiPF_6$ may be more preferable. These lithium salts make it possible to lower internal resistance, thereby achieving a higher effect. However, the electrolyte salt is not limited to the above-described materials, and may be a material other than the above-described materials.

A content of the electrolyte salt is not specifically limited, but in particular, may be preferably from 0.3 mol/kg to 3.0 mol/kg both inclusive with respect to the solvent. High ion conductivity is achievable in this range.

[Operation of Secondary Battery]

The secondary battery may operate as follows, for example. When the secondary battery is charged, lithium ions extracted from the cathode 21 are inserted in the anode 22 through the electrolytic solution. In contrast, when the secondary battery is discharged, lithium ions extracted from the anode 22 are inserted in the cathode 21 through the electrolytic solution.

[Method of Manufacturing Secondary Battery]

The secondary battery may be manufactured by the following procedure, for example.

When fabricating the cathode 21, first, for example, the cathode active material, the cathode binder, and any other material are mixed to obtain a cathode mixture. Subsequently, the cathode mixture is dispersed in, for example, an organic solvent to obtain paste cathode mixture slurry. Next, the cathode mixture slurry is applied onto both surfaces of the cathode current collector 21A, and thereafter, the applied cathode mixture slurry is dried to form the cathode active material layers 21B. Thereafter, the cathode active material layers 21B is compression-molded with use of, for example, a roll pressing machine. In this case, the cathode active material layer 21B may be compression-molded while being heated, or may be compression-molded a plurality of times.

Next, the anode 22 is fabricated using a manufacturing procedure similar to the procedure of manufacturing the anode of the present technology. In this case, the anode active material layers 22B are formed on both surfaces of the anode current collector 22A.

Finally, the secondary battery is assembled using the cathode 21 and the anode 22. The cathode lead 25 is attached to the cathode current collector 21A by a welding method or any other method, and the anode lead 26 is attached to the anode current collector 22A by a welding method or any other method. Subsequently, the cathode 21 and the anode 22 are stacked with the separator 23 in between, and the resultant stacked body is spirally wound to form the spirally wound electrode body 20. Thereafter, the center pin 24 is inserted in the center of the spirally wound electrode body 20. Afterward, the spirally wound electrode body 20 is sandwiched between the pair of insulating plates 12 and 13, and is contained inside the battery can 11. In this case, an end tip of the cathode lead 25 is attached to the safety valve mechanism 15 by a welding method or any other method, and an end tip of the anode lead 26 is attached to the battery can 11 by a welding method or any other method. Subsequently, the electrolytic solution in which the electrolyte salt is dispersed in a solvent is injected inside the battery can 11, and the separator 23 is impregnated with the injected electrolytic solution. Thereafter, the battery cover 14, the safety valve mechanism 15, and the PTC device 16 are swaged with the gasket 17 at the open end of the battery can 11.

[Action and Effects of Secondary Battery]

According to the cylindrical type secondary battery, the anode 22 has a configuration similar to the configuration of the anode 10 illustrated in FIG. 1. Therefore, adhesibility between the anode active material and electrolytic solution in the anode active material layers 22B are improved, and a stable interface following expansion and contraction of the anode active material in association with charge and discharge is formed between the anode active material and the electrolytic solution. This makes it possible to achieve superior battery characteristics.

(2-2. Lithium-Ion Secondary Battery (Laminated Film Type))

FIG. 5 illustrates an exploded perspective configuration of another secondary battery according to an embodiment of the present technology. FIG. 6 enlarges a cross-section taken along a line IV-IV of a spirally wound electrode body 30 illustrated in FIG. 5. In description below, the components of the cylindrical-type secondary battery that have been already described above are cited where appropriate.

[Configuration of Secondary Battery]

The secondary battery described here may be, for example, a so-called laminated film type lithium-ion secondary battery. In the secondary battery, the spirally wound electrode body 30 is contained inside a film-like outer package member 40. In the spirally wound electrode body 30, a cathode 33 and an anode 34 are stacked with a separator 35 and an electrolyte layer 36 in between, and the resultant stacked body is spirally wound. A cathode lead 31 is attached to the cathode 33, and an anode lead 32 is attached to the anode 34. An outermost periphery of the spirally wound electrode body 30 is protected by a protective tape 37.

Each of the cathode lead 31 and the anode lead 32 may be led out from inside to outside of the outer package member 40 in a same direction, for example. The cathode lead 31 may be made of, for example, a conductive material such as aluminum, and the anode lead 32 may be made of, for example, a conductive material such as copper, nickel, and stainless steel. These conductive materials may have a thin-plate shape or a mesh shape, for example.

The outer package member 40 may be a laminated film in which a fusion bonding layer, a metal layer, and a surface protective layer are laminated in this order, for example. Two laminated films are stacked so that the fusion bonding layers thereof are opposed to the spirally wound electrode body 30 and outer edges of the fusion bonding layer are fusion-bonded. It is to be noted that the two laminated films may be bonded to each other by, for example, an adhesive. The fusion bonding layer may be, for example, a film made of one or more of polyethylene, polypropylene, and other materials. Non-limiting examples of the metal layer may include an aluminum foil. The surface protective layer may be, for example, a film made of one or more of nylon, polyethylene terephthalate, and other materials.

In particular, the outer package member 40 may be preferably an aluminum laminated film in which a polyethylene film, an aluminum foil, and a nylon film are laminated in this order. Alternatively, the outer package member 40 may be a laminated film having other laminated structure, a polymer film made of a polymer such as polypropylene, or a metal film.

An adhesive film 41 for prevention of outside air intrusion is inserted between the outer package member 40 and the cathode lead 31, and the adhesive film 41 is also inserted between the outer package member 40 and the anode lead 32. The adhesive film 41 is made of a material having adhesibility with respect to the cathode lead 31 and the anode lead 32. Non-limiting examples of the material having adhesibility may include a polyolefin resin such as one or more of polyethylene, polypropylene, modified polyethylene, and modified polypropylene.

The cathode 33 may include, for example, a cathode active material layer 33B on a single surface or both surfaces of a cathode current collector 33A. Similarly, the anode 34 may include, for example, an anode active material layer 34B on a single surface or both surfaces of an anode current collector 34A. For example, configurations of the cathode current collector 33A, the cathode active material layer 33B, the anode current collector 34A, and the anode active material layer 34B may be similar to the configurations of the cathode current collector 21A, the cathode active material layer 21B, the anode current collector 22A, and the anode active material layer 22B, respectively. For example, a configuration of the separator 35 may be similar to the configuration of the separator 23.

An electrolyte layer 36 may be a so-called gel electrolyte, in which the electrolytic solution is held by the polymer compound. The gel electrolyte achieves high ion conductivity (for example, about 1 mS/cm or higher at room temperature), and prevents liquid leakage of the electrolytic solution. The electrolyte layer 36 may further include one or more of other materials such as an additive as necessary.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, polycarbonate, and a copolymer of vinylidene fluoride and hexafluoropyrene. In particular, polyvinylidene fluoride and the copolymer of vinylidene fluoride and hexafluoropyrene may be preferable, and polyvinylidene fluoride may be more preferable. Polyvinylidene fluoride is electrochemically stable.

A composition of the electrolytic solution may be similar to a composition of the electrolytic solution in the cylindrical type secondary battery, for example. However, in the electrolyte layer 36 that is a gel electrolyte, the solvent contained in the electrolytic solution refers to a wide concept that encompasses not only a liquid solvent but also a material having ion conductivity that has ability to dissociate the electrolyte salt. Hence, in a case where a polymer compound having ion conductivity is used, the polymer compound is also encompassed by the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate as follows, for example. When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 may be manufactured, for example, by one of the following three procedures.

In a first procedure, the cathode 33 and the anode 34 are fabricated by a fabrication procedure similar to the procedure of fabricating the cathode 21 and the anode 22. In this case, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, for example, the electrolytic solution, the polymer compound, and a solvent are mixed to prepare a precursor solution. Non-limiting examples of the solvent may include an organic solvent. Subsequently, the cathode 33 and the anode 34 are coated with the precursor solution, and the precursor solution is dried to form the gel electrolyte layer 36. Subsequently, the cathode lead 31 is attached to the cathode current collector 33A by a welding method or any other method, and the anode lead 32 is attached to the anode current collector 34A by a welding method or any other method. Subsequently, the cathode 33 and the anode 34 are stacked with the separator 35 in between and are spirally wound to fabricate the spirally wound electrode body 30. Thereafter, the protective tape 37 is attached onto the outermost periphery of the spirally wound electrode body 30. Subsequently, after the spirally wound electrode body 30 is sandwiched between two film-like outer package members 40, the outer edges of the outer package members 40 are bonded to each other by a thermal fusion bonding method or any other method to enclose the spirally wound electrode body 30 between the outer package members 40. In this case, the adhesive films 41 are inserted between the cathode lead 31 and the outer package member 40 and between the anode lead 32 and the outer package member 40.

In a second procedure, the cathode lead 31 is attached to the cathode 33, and the anode lead 32 is attached to the anode 34. Subsequently, the cathode 33 and the anode 34 are laminated with the separator 35 in between, and are spirally wound to fabricate a spirally wound body that is a precursor of the spirally wound electrode body 30. Thereafter, the protective tape 37 is attached onto the outermost periphery of the spirally wound body. Subsequently, after the spirally wound body is sandwiched between two film-like outer package members 40, the outer edges except for outer edges on one side of the outer package members 40 are bonded by a thermal fusion bonding method or any other method to contain the spirally wound body inside a pouch formed of the outer package members 40. Subsequently, the electrolytic solution, monomers that are raw materials of the polymer compound, a polymerization initiator, and, on as-necessary basis, other materials such as a polymerization inhibitor are mixed to prepare a composition for electrolyte. Subsequently, the composition for electrolyte is injected inside the pouch formed of the outer package members 40. Thereafter, the pouch formed of the outer package members 40 is hermetically sealed by a thermal fusion bonding method or any other method. Subsequently, the monomers are thermally polymerized to form the polymer compound. The gel electrolyte layer 36 is thereby formed.

In a third procedure, the spirally wound body is fabricated and contained inside the pouch formed of the outer package members 40 in a similar manner to that of the second procedure described above, except that the separator 35 with both surfaces coated with a polymer compound is used. Non-limiting examples of the polymer compound with which the separator 35 is coated may include a polymer (a homopolymer or a copolymer) containing vinylidene fluoride as a component. Non-limiting specific examples thereof may include polyvinylidene fluoride, a binary copolymer containing vinylidene fluoride and hexafluoropropylene as components, and a ternary copolymer containing vinylidene fluoride, hexafluoropropylene, and chlorotrifluoroethylene as components. It is to be noted that one or more of other polymer compounds may be used together with the polymer containing vinylidene fluoride as a component. Subsequently, the electrolytic solution is prepared and injected inside the pouch formed of the outer package members 40. Thereafter, an opening of the pouch formed of the outer package members 40 is hermetically sealed by a thermal fusion bonding method or any other method. Subsequently, the resultant is heated while a weight is applied to the outer package members 40 to allow the separator 35 to be closely attached to the cathode 33 with the polymer compound in between and allow the separator 35 to be closely attached to the anode 34 with the polymer compound in between. Thus, the polymer compound is impregnated with the electrolytic solution, and the polymer compound is gelated. The electrolyte layer 36 is thereby formed.

In the third procedure, swollenness of the secondary battery is suppressed more than in the first procedure. Further, in the third procedure, for example, the monomers that are the raw materials of the polymer compound and the solvent are hardly left in the electrolyte layer 36, compared to in the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the laminated film type secondary battery, the anode 34 has a configuration similar to the configuration of the anode 10 illustrated in FIG. 1. For a similar reason to the reason in the cylindrical type secondary battery, such a configuration makes it possible to achieve superior battery characteristics (2-3. Lithium-Ion Secondary Battery (Square Type))

FIG. 7 and FIG. 8 each illustrate a cross-sectional configuration of a third secondary battery. A cross-section illustrated in FIG. 7 and a cross-section illustrated in FIG. 8 have a relationship of positions orthogonal to each other. In other words, FIG. 8 is a cross-sectional view in an arrow direction along a line VIII-VIII illustrated in FIG. 7.

[Configuration of Secondary Battery]

The secondary battery is referred to as a so-called square type, and is a lithium-ion secondary battery that contains a spirally wound electrode body 60 of a flat shape inside an outer package can 51 that has a substantially hollow cuboid shape.

The outer package can 51 may be made of, for example, nickel (Ni)-plated iron (Fe), and has also a function as an anode terminal. One end of the outer package can 51 is closed, and the other end of the outer package can 51 is open. An insulating plate 52 and a battery cover 53 are attached to the open end of the outer package can 51 to hermetically seal inside of the outer package can 51. The insulating plate 52 may be made of a material such as polypropylene, and is disposed on the spirally wound electrode body 60 perpendicularly to a spirally wound periphery surface of the spirally wound electrode body 60. The battery cover 53 may be made of, for example, a material similar to the material of the outer package can 51, and has also a function as an anode terminal along with the outer package can 51. A terminal block 54 serving as a cathode terminal is disposed outside the battery cover 53. Further, the battery cover 53 has a through-hole in the vicinity of the center thereof, and a cathode pin 55 that is electrically coupled to the terminal block 54 is inserted into the through-hole. The terminal block 54 is electrically insulated from the battery cover 53 by an insulating case 56, and the cathode pin 55 is electrically insulated from the battery cover 53 by a gasket 57. The insulating case 56 may be made of, for example, polybutylene terephthalate. The gasket 57 may be made of, for example, an insulating material, and a surface of the gasket 57 is coated with asphalt.

The battery cover 53A has a cleavage valve 58 and an electrolytic solution injecting hole 59 in the vicinity of an outer edge thereof. The cleavage valve 58 is electrically coupled to the battery cover 53, and when internal pressure of the battery reaches a certain level or higher as a result of internal short circuit, heating from outside or any other reason, the cleavage valve 58 is cleaved to suppress an increase in the internal pressure. The electrolytic solution injecting hole 59 may be plugged with a sealing member 59A made of, for example, stainless-steel balls.

In the spirally wound electrode body 60, a cathode 61 and an anode 62 are stacked with a separator 63 in between and are spirally wound. The spirally wound electrode body 60 is formed in a flat shape to fit to the shape of the outer package can 51. The separator 63 is located at the outermost perimeter of the spirally wound electrode body 60, and the cathode 61 is located at a position just inner side of the separator 63. FIG. 8 illustrates a stacked structure of the cathode 61 and the anode 62 in a simplified manner. Further, the number of winding of the spirally wound electrode body 60 is not limited to that illustrated in FIG. 7 and FIG. 8, and may be set to any number. A cathode lead 64 made of aluminum (Al) or any other material is coupled to the cathode 61 of the spirally wound electrode body 60, and an anode lead 65 made of nickel or any other material is coupled to the anode 62. The cathode lead 64 is electrically coupled to the terminal block 54 by being welded to a lower end of the cathode pin 55, and the anode lead 65 is electrically coupled to the outer package can 51 by being welded to the outer package can 51.

As illustrated in FIG. 7, in the cathode 61, a cathode active material layer 61B is provided on a single surface or both surfaces of a cathode current collector 61A, and in the anode 62, an anode active material layer 62B is provided on a single surface or both surfaces of an anode current collector 62A. Configurations of the cathode current collector 61A, cathode active material layers 61B, anode current collector 62A, anode active material layers 62B, and separator 63 are similar to the configuration of the cathode current collector 21A, the cathode active material layers 21B, the anode current collector 22A, the anode active material layers 22B, and the separator 23 in the above-described first secondary battery, respectively. The separator 63 is impregnated with an electrolytic solution similar to the electrolytic solution used for the separator 23.

The secondary battery may be manufactured by the following procedure, for example.

As with the above-described cylindrical type secondary battery, the cathode 61 and the anode 62 are stacked with the separator 63 in between, and the resultant stacked body is spirally wound to form the spirally wound electrode body 60. Thereafter, the spirally wound electrode body 60 is contained inside the outer package can 51. Subsequently, the insulating plate 52 is attached on the spirally wound electrode body 60, and the anode lead 65 is welded to the outer package can 51, while the cathode lead 64 is welded to the lower end of the cathode pin 55 to fix the battery cover 53 to the open end of the outer package can 51 by laser welding. Finally, an electrolytic solution is injected inside the outer package can 51 through the electrolytic solution injecting hole 59, and the separator 63 is impregnated with the electrolytic solution, and thereafter the electrolytic solution injecting hole 59 is plugged with the sealing member 59A. Thus, the secondary battery illustrated in FIG. 7 and FIG. 8 is completed.

According to the third secondary battery, the anode 62 has a configuration similar to the configuration of the anode 10 illustrated in FIG. 1, which makes it possible to improve the cycle characteristics while achieving higher capacity.

(3. Applications of Secondary Battery)

Next, the description will be provided on application examples of any of the secondary batteries described above.

Applications of the secondary battery are not particularly limited as long as the secondary battery is applied to a machine, a device, an instrument, an apparatus, a system (a collective entity of, for example, a plurality of devices), and any other equipment that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case where the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for any application other than the applications mentioned above.

In particular, the secondary battery is effectively applicable to, for example but not limited to, the battery pack, the electric vehicle, the electric power storage system, the electric power tool, and the electronic apparatus, in these applications, superior battery characteristics are demanded, and using the secondary battery of the present technology makes it possible to effectively improve performance. It is to be noted that the battery pack is a power source that uses the secondary battery, and may be, for example, a so-called assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Here, specific description will be provided on some application examples of the secondary battery. It is to be noted that configurations of the respective application examples described below are mere examples, and may be changed as appropriate.

(3-1. Battery Pack)

FIG. 9 illustrates a block configuration of a battery pack. For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 in a housing 60 that may be made of a plastic material or any other material.

The controller 61 controls an operation of the entire battery pack (including a used state of the power source 62), and may include, for example, a central processing unit (CPU). The power source 62 includes one or more of secondary batteries (not illustrated). The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether or not the power source 62 is connectable to an external device) in accordance with an instruction from the controller 61. The switch section 63 may include, for example, a charge control switch, a discharge control switch, a charging diode, and a discharging diode. Each of the charge control switch and the discharge control switch may be, for example, a semiconductor switch such as a field-effect transistor that uses a metal oxide semiconductor (a MOSFET).

The current measurement section 64 measures a current with use of the current detection resistance 70, and outputs a result of the measurement to the controller 61. The temperature detector 65 measures a temperature with use of the temperature detecting element 69, and outputs a result of the measurement to the controller 61. The result of the temperature measurement may be used, for example, in a case where the controller 61 performs charge and discharge control at the time of abnormal heat generation, in a case where the controller 61 performs a correction process at the time of calculating remaining capacity, or in any other case. The voltage detector 66 measures voltages of the secondary batteries in the power source 62, performs analog-to-digital conversion on the measured voltages, and supplies the resultant to the controller 61.

The switch controller 67 controls an operation of the switch section 63 in accordance with signals inputted from the current measurement section 64 and the voltage detector 66.

For example, in a case where the battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case where the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

The memory 68 may be, for example, an EEPROM that is a non-volatile memory. The memory 68 may hold, for example, numerical values calculated by the controller 61, information of the secondary battery measured in a manufacturing process (such as internal resistance in an initial state). It is to be noted that, in a case where the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may be, for example, a thermistor.

The cathode terminal 71 and the anode terminal 72 are terminals that may be coupled to an external device (such as a notebook personal computer) driven with use of the battery pack, an external device (such as a battery charger) used for charging the battery pack, or any other device. The power source 62 is charged and discharged via the cathode terminal 71 and the anode terminal 72.

(3-2. Electric Vehicle)

FIG. 10 illustrates a block configuration of a hybrid automobile that is an example of an electric vehicle. The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case where the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted power is accumulated in the power source 76. In a case where the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 88 via the differential 78, the transmission 80, and the clutch 81 that are the drive sections, for example.

It is to be noted that, when speed of the electric vehicle is decreased by an unillustrated brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of an unillustrated throttle valve. The various sensors 84 may include, for example, a speed sensor, an acceleration sensor, and an engine frequency sensor.

It is to be noted that, the description has been provided on a case where the electric vehicle is the hybrid automobile; however, the electric vehicle may be a vehicle (an electric automobile) that operates with use of only the power source 76 and the motor 77 without using the engine 75.

(3-3. Electric Power Storage System)

FIG. 11 illustrates a block configuration of an electric power storage system. The electric power storage system may include, for example, a controller 90, a power source 91, a smart meter 92, and a power hub 93 inside a house 89 such as a general residence or a commercial building.

In this example, the power source 91 may be coupled to an electric device 94 provided inside the house 89, and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Non-limiting examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries (not illustrated). The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 91. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the electric power storage system described above may be provided for each household (each family unit), or may be provided for a plurality of households (a plurality of family units).

(3-4. Electric Power Tool)

FIG. 12 illustrates a block configuration of an electric power tool. The electric power tool may be, for example, an electric drill, and may include a controller 99 and a power source 100 inside a tool body 98 made of a plastic material or any other material. A drill section 101 that is a movable section may be attached to the tool body 98 in an operable (rotatable) manner, for example.

The controller 99 controls an operation of the entire electric power tool (including a used state of the power source 100), and may include, for example, a CPU. The power source 100 includes one or more secondary batteries (not illustrated). The controller 99 allows electric power to be supplied from the power source 100 to the drill section 101 in accordance with an operation by an unillustrated operation switch.

EXAMPLES

Detailed description will be provided on specific examples of the present technology.

Experimental Example 1

A laminated film type lithium-ion secondary battery illustrated in FIG. 5 and FIG. 6 was fabricated. The laminated film type lithium-ion secondary battery included the cathode 33, the anode 34, the electrolyte 36, and other components.

The cathode 33 was fabricated as follows. First, 95 parts by mass of a cathode active material ($LiCo_{0.98}Al_{0.01}Mg_{0.01}O_2$), 3 parts by mass of a cathode binder (polyvinylidene fluoride), and 2 parts by mass of a cathode conductor (graphite) were mixed to prepare a cathode mixture. Subsequently, the cathode mixture was dispersed in an organic solvent (N-methyl-2-pyrolidone) to prepare paste cathode mixture shiny. Thereafter, the cathode mixture slurry was applied onto both surfaces of the cathode current collector 33A (a strip-shaped aluminum foil with a thickness of 12 μm) using a coating apparatus, and then the cathode mixture slurry was dried to form the cathode active material layer 33B. Lastly, the cathode active material layer 33B was compression-molded using a roll pressing machine.

The anode 34 was fabricated as follows. First, 96 parts by mass of natural graphite as an anode active material was dispersed in water in which 1 part by mass of an anode conductor and 3 parts by mass of PVDF were added to prepare paste anode mixture slurry. Subsequently, the above-described anode mixture slurry was applied onto both surfaces of the anode current collector 34A, and then the anode mixture slurry was dried at a temperature of 80° C. to form an active material preparatory layer. Thereafter, the whole active material preparatory layer was heated at 190° C. that was a temperature equal to or higher than a melting point of PVDF, and PVDF was melted on the surface of the anode active material, thereby forming a coating on a portion of the surface of the anode active material. As a result, the anode active material layers 34B were obtained on both surfaces of the anode current collector 34A. Lastly, the anode active material layer 34B was compression-molded using a roll pressing machine. A strip-shaped copper foil with a thickness of 10 μm was used as the anode current collector 34A.

After fabrication of the secondary battery, it was confirmed in the following manner that a coating had been formed on a portion of the surface of the anode active material. First, the secondary battery was disassembled to separate the anode 34, and then the surface of the anode active material layer 34B was observed with use of a scanning electron microscope (SEM) to confirm the presence of the coating. Next, the anode active material layer 34B was detached from the anode current collector 34A, and magnified observation of the coating was carried out with use of the scanning electron microscope (SEM). Subsequently, the anode active material layer 34B was washed with water to remove any water-soluble component. Further, the anode active material layer 34B was washed with N-ethyl-2-pyrolidone (NMP) to extract a component soluble in NMP from among components insoluble in water. The extracted component were dried, and a composition of the obtained component was identified with use of various analytical techniques such as infrared spectroscopy (IR), nuclear magnetic resonance (NMR), or gel permeation chromatography (GPC).

An electrolytic solution was prepared by dissolving $LiPF_6$ with a concentration of 1 mol/kg in a solvent in which ethylene carbonate and propylene carbonate were mixed at a mass ratio of 1:1.

The secondary battery was assembled as follows. At the beginning, the gel electrolyte layer 36 was formed in the following manner. First, the above-described electrolytic solution, polyvinylidene fluoride, and an organic solvent (dimethyl carbonate) for viscosity adjustment were mixed to prepare a precursor solution. Here, a weight ratio of the electrolytic solution to polyvinylidene fluoride was 9:1. Next, the prepared precursor solution was applied onto each of the cathode 33 and the anode 34, and then the precursor solution was dried. After the gel electrolyte layer 36 was formed in such a manner, the cathode lead 31 made of aluminum was welded to the cathode 33 (the cathode current collector 33A), and the anode lead 32 made of copper was welded to the anode 34 (the anode current collector 34A). Subsequently, the cathode 33 and the anode 34 were stacked with the separator 35 (a microporous polyethylene film with a thickness of 10 μm) in between, and the stacked body was spirally wound in a longitudinal direction to fabricate the spirally wound electrode body 30. Thereafter, a protective tape 37 was attached to the outermost periphery of the spirally wound electrode body 30. Further, the outer package member 40 was folded to interpose the spirally wound electrode body 30, and then outer edges on three sides of the outer package member 40 were bonded by thermal fusion bonding to contain the spirally wound electrode body inside a pouch formed of the outer package member 40. The outer package member 40 was a moisture-resistant aluminum laminated film (having a total thickness of 100 μm) in which a nylon film (having a thickness of 30 μm), an aluminum foil (having a thickness of 40 μm), and a cast polypropylene film (having a thickness of 30 μm) were laminated in this order from outside. In this case, the adhesive film 41 (an acid-modified propylene film having a thickness of 50 μm) was inserted between the cathode lead 31 and the outer package member 40, and the adhesive film 41 was inserted between the anode lead 32 and the outer package member 40 in a similar manner.

Experimental Example 2

The secondary battery was fabricated similarly to the experimental example 1 with the exception that at the time of fabrication of the anode 34, an operation of heating the entirety of the anode 34 was not performed, and a coating was not formed on the surface of the anode active material.

Experimental Example 3

At the time of fabrication of the anode 34, 96 parts by mass of natural graphite as an anode active material was dispersed in water in which 1 part by mass of the anode conductor, 1.5 parts by mass of PVDF, and 1.5 parts by mass of carboxymethyl cellulose (CMC) were added to prepare paste anode mixture slurry. Except for this point, the secondary battery was fabricated similarly to the experimental example 1.

Experimental Example 4

The secondary battery was fabricated similarly to the experimental example 3 with the exception that at the time of fabrication of the anode 34, an operation of heating the entirety of the anode 34 was not performed, and a coating was not formed on the surface of the anode active material.

Experimental Example 5

At the time of fabrication of the anode 34, 96 parts by mass of natural graphite as an anode active material was dispersed in water, in which 1 part by mass of the anode conductor, 1.5 parts by mass of PVDF, and 1.5 parts by mass of polyethylene oxide (PEO) were added to prepare paste anode mixture slurry. Except for this point, the secondary battery was fabricated similarly to the experimental example 1.

Experimental Example 6

At the time of fabrication of the anode 34, 96 parts by mass of natural graphite as an anode active material was dispersed in water in which 1 part by mass of the anode conductor, 1.5 parts by mass of PVDF, and 1.5 parts by mass of polyacrylic acid were added to prepare paste anode mixture slurry. Except for this point, the secondary battery was fabricated similarly to the experimental example 1.

Experimental Example 7

At the time of fabrication of the anode 34, 96 parts by mass of natural graphite as an anode active material was dispersed in water in which 1 part by mass of the anode conductor, 1.5 parts by mass of PVDF, and 1.5 parts by mass of sodium polyacrylate were added to prepare paste anode mixture slurry. Except for this point, the secondary battery was fabricated similarly to the experimental example 1.

Experimental Example 8

At the time of fabrication of the anode 34, 96 parts by mass of natural graphite as an anode active material was dispersed in water in which 1 part by mass of the anode conductor, 1.5 parts by mass of PVDF, and 1.5 parts by mass of polyvinyl alcohol were added to prepare paste anode mixture slurry. Except for this point, the secondary battery was fabricated similarly to the experimental example 1.

Experimental Example 9

At the time of fabrication of the anode 34, 96 parts by mass of natural graphite as an anode active material was dispersed in water in which 1 part by mass of the anode conductor, 1.5 parts by mass of PVDF, and 1.5 parts by mass of polyacrylamide were added to prepare paste anode mixture slurry. Except for this point, the secondary battery was fabricated similarly to the experimental example 1.

Experimental Example 10

The secondary battery was fabricated similarly to the experimental example 3 with the exception that at the time of fabrication of the anode 34, an entire surface of the anode active material was covered with a coating.

Experimental Example 11

Instead of forming the gel electrolyte layer 36 by applying the prepared precursor solution onto each of the cathode 33 and the anode 34 and then drying the precursor solution, the spirally wound electrode body 30 was fabricated in the following manner. After application of PVDF onto the separator 35, the cathode 33 and the anode 34 were stacked with the separator 35 in between, and the stacked body was spirally wound in a longitudinal direction to form the spirally wound electrode body 30. Further, the above-described electrolytic solution was injected into the inside of the outer package member 40, and the spirally wound electrode body 30 was impregnated with the electrolytic solution. Except for this point, the secondary battery was fabricated similarly to the experimental example 3.

Experimental Example 12

The secondary battery was fabricated similarly to the experimental example 3 with the exception that the gel electrolyte layer 36 holding the electrolytic solution was not formed, and the above-described electrolytic solution was injected into the inside of the outer package member 40, and the spirally wound electrode body 30 was impregnated with the electrolytic solution.

Experimental Example 13

The secondary battery was fabricated similarly to the experimental example 12 with the exception that at the time of fabrication of the anode 34, an operation of heating the entirety of the anode 34 was not performed, and a coating was not formed on the surface of the anode active material.

Experimental Example 14

The secondary battery was fabricated similarly to the experimental example 3 with the exception that silicon (Si) was used as an anode active material.

Experimental Example 15

The secondary battery was fabricated similarly to the experimental example 3 with the exception that a mixture of 20 parts by mass of silicon (Si) and 80 parts by mass of graphite was used as an anode active material.

Experimental Example 16

The secondary battery was fabricated similarly to the experimental example 3 with the exception that tin (Sn) was used as an anode active material.

Experimental Example 17

At the time of fabrication of the anode 34, 96 parts by mass of natural graphite as an anode active material was dispersed in water in which 1 part by mass of the anode conductor, 2.0 parts by mass of PVDF, 0.6 parts by mass of CMC, and 0.4 parts by mass of styrene-butadiene rubber (SBR) were added to prepare paste anode mixture slurry. Except for this point, the secondary battery was fabricated similarly to the experimental example 1.

Experimental Example 18

The secondary battery was fabricated similarly to the experimental example 3 with the exception that an upper-limit voltage at the time of charge to be hereinafter described was set to 4.2 V.

Experimental Example 19

The secondary battery was fabricated similarly to the experimental example 18 with the exception that at the time of fabrication of the anode 34, an operation of heating the entirety of the anode 34 was not performed, and a coating was not formed on the surface of the anode active material.

Experimental Example 20

The secondary battery was fabricated similarly to the experimental example 14 with the exception that at the time of fabrication of the anode 34, an operation of heating the entirety of the anode 34 was not performed, and a coating was not formed on the surface of the anode active material.

Experimental Example 21

The secondary battery was fabricated similarly to the experimental example 15 with the exception that at the time of fabrication of the anode 34, an operation of heating the entirety of the anode 34 was not performed, and a coating was not formed on the surface of the anode active material.

Experimental Example 22

The secondary battery was fabricated similarly to the experimental example 16 with the exception that at the time of fabrication of the anode 34, an operation of heating the entirety of the anode 34 was not performed, and a coating was not formed on the surface of the anode active material.

Experimental Example 23

The secondary battery was fabricated similarly to the experimental example 17 with the exception that at the time of fabrication of the anode 34, an operation of heating the entirety of the anode 34 was not performed, and a coating was not formed on the surface of the anode active material.

Experimental Example 24

The secondary battery was fabricated similarly to the experimental example 1 with the exception that at the time of fabrication of the anode 34, a copolymer of vinylidene fluoride and hexafluoropyrene was used instead of PVDF.

Experimental Example 25

The secondary battery was fabricated similarly to the experimental example 1 with the exception that at the time of fabrication of the anode 34, a copolymer of vinylidene fluoride and monomethyl maleate was used instead of PVDF.

Experimental Example 26

The secondary battery was fabricated similarly to the experimental example 1 with the exception that at the time of fabrication of the anode 34, a copolymer of vinylidene fluoride and chlorotrifluoroethylene was used instead of PVDF.

Experimental Example 27

The secondary battery was fabricated similarly to the experimental example 1 with the exception that at the time of fabrication of the anode 34, a copolymer of vinylidene fluoride and tetrafluoroethylene was used instead of PVDF.

Experimental Example 28

The secondary battery was fabricated similarly to the experimental example 1 with the exception that at the time of fabrication of the anode 34, a copolymer of vinylidene fluoride, hexafluoropyrene, and monomethyl maleate was used instead of PVDF.

Experimental Example 29

The secondary battery was fabricated similarly to the experimental example 24 with the exception that at the time of fabrication of the anode 34, an operation of heating the entirety of the anode 34 was not performed, and a coating was not formed on the surface of the anode active material.

Experimental Example 30

The secondary battery was fabricated similarly to the experimental example 25 with the exception that at the time of fabrication of the anode 34, an operation of heating the entirety of the anode 34 was not performed, and a coating was not formed on the surface of the anode active material.

Experimental Example 31

The secondary battery was fabricated similarly to the experimental example 26 with the exception that at the time of fabrication of the anode 34, an operation of heating the entirety of the anode 34 was not performed, and a coating was not formed on the surface of the anode active material.

Experimental Example 32

The secondary battery was fabricated similarly to the experimental example 27 with the exception that at the time of fabrication of the anode 34, an operation of heating the entirety of the anode 34 was not performed, and a coating was not formed on the surface of the anode active material.

Experimental Example 33

The secondary battery was fabricated similarly to the experimental example 28 with the exception that at the time of fabrication of the anode 34, an operation of heating the entirety of the anode 34 was not performed, and a coating was not formed on the surface of the anode active material.

[Measurement of Battery Characteristics]

As the battery characteristics of the secondary battery in each of the experimental examples, charge and discharge cycle characteristics and change in the thickness after 500 cycles of charge and discharge were examined, and the results as illustrated in Tables 1 to 3 were obtained.

The cycle characteristics were examined as follows. One cycle of charge and discharge was performed on the secondary battery in an ambient temperature environment (at 23° C.) to stabilize a battery state of the secondary battery, and thereafter, one cycle of charge and discharge was further performed on the secondary battery in the same environment to measure discharge capacity at the second cycle. Subsequently, the secondary battery was repeatedly charged and discharged until the total number of cycles reached 500 cycles in the same environment to measure discharge capacity at the 500th cycle. A cycle retention ratio (%)=(discharge capacity at the 500th cycle/discharge capacity at the second cycle)×100 was calculated from these results. When the secondary battery was charged, charge was performed at a current of 0.5 C until the voltage reached 4.3 V, and thereafter, charge was further performed at the voltage of 4.3 V until the current reached 0.05 C. When the secondary battery was discharged, discharge was performed at a current of 0.5 C until the voltage reached 3.0 V. It is to be noted that "0.5 C" refers to a current value at which the battery capacity (theoretical capacity) is completely discharged in 2 hours, and "0.05 C" refers to a current value at which the battery capacity is completely discharged in 20 hours.

TABLE 1

| | Anode active material | Anode binder | Coating | Gel electrolyte layer | Upper limit of charge voltage (V) | Cycle retention ratio (%) | Thickness change rate (%) |
|---|---|---|---|---|---|---|---|
| Experimental example 1 | Graphite | PVDF | Available | Available | 4.3 | 93 | +6 |
| Experimental example 2 | Graphite | PVDF | Not available | Available | 4.3 | 48 | +56 |
| Experimental example 3 | Graphite | PVDF/CMC | Available | Available | 4.3 | 96 | +4 |
| Experimental example 4 | Graphite | PVDF/CMC | Not available | Available | 4.3 | 50 | +55 |
| Experimental example 5 | Graphite | PVDF/PEO | Available | Available | 4.3 | 90 | +9 |
| Experimental example 6 | Graphite | PVDF/polyacrylic acid | Available | Available | 4.3 | 96 | +4 |
| Experimental example 7 | Graphite | PVDF/sodium polyacrylate | Available | Available | 4.3 | 95 | +5 |
| Experimental example 8 | Graphite | PVDF/polyvinyl alcohol | Available | Available | 4.3 | 96 | +5 |
| Experimental example 9 | Graphite | PVDF/polyacrylamide | Available | Available | 4.3 | 95 | +4 |
| Experimental example 10 | Graphite | PVDF/CMC | Available (entire surface) | Available | 4.3 | 91 | +7 |

TABLE 2

| | Anode active material | Anode binder | Coating | Gel electrolyte layer | Upper limit of charge voltage (V) | Cycle retention ratio (%) | Thickness change rate (%) |
|---|---|---|---|---|---|---|---|
| Experimental example 11 | Graphite | PVDF/CMC | Available | PVDF was applied on separator. | 4.3 | 95 | +5 |
| Experimental example 12 | Graphite | PVDF/CMC | Available | Not available | 4.3 | 68 | +42 |
| Experimental example 13 | Graphite | PVDF/CMC | Not available | Not available | 4.3 | 40 | +59 |
| Experimental example 14 | Silicon | PVDF/CMC | Available | Available | 4.3 | 91 | +18 |
| Experimental example 15 | Graphite/silicon | PVDF/CMC | Available | Available | 4.3 | 96 | +15 |
| Experimental example 16 | Tin | PVDF/CMC | Available | Available | 4.3 | 94 | +16 |

TABLE 2-continued

|  | Anode active material | Anode binder | Coating | Gel electrolyte layer | Upper limit of charge voltage (V) | Cycle retention ratio (%) | Thickness change rate (%) |
|---|---|---|---|---|---|---|---|
| Experimental example 17 | Graphite | PVDF/CMC/SBR | Available | Available | 4.3 | 96 | +5 |
| Experimental example 18 | Graphite | PVDF/CMC | Available | Available | 4.2 | 94 | +5 |
| Experimental example 19 | Graphite | PVDF/CMC | Not available | Available | 4.2 | 60 | +50 |

TABLE 3

|  | Anode active material | Anode binder | Coating | Gel electrolyte layer | Upper limit of charge voltage (V) | Cycle retention ratio (%) | Thickness change rate (%) |
|---|---|---|---|---|---|---|---|
| Experimental example 20 | Silicon | PVDF/CMC | Not available | Available | 4.3 | 41 | +60 |
| Experimental example 21 | Graphite/silicon | PVDF/CMC | Not available | Available | 4.3 | 48 | +57 |
| Experimental example 22 | Tin | PVDF/CMC | Not available | Available | 4.3 | 43 | +57 |
| Experimental example 23 | Graphite | PVDF/CMC/SBR | Not available | Available | 4.3 | 51 | +54 |
| Experimental example 24 | Graphite | PVDF/HFP | Available | Available | 4.3 | 93 | +7 |
| Experimental example 25 | Graphite | PVDF/MMM | Available | Available | 4.3 | 94 | +5 |
| Experimental example 26 | Graphite | PVDF/CTFE | Available | Available | 4.3 | 92 | +7 |
| Experimental example 27 | Graphite | PVDF/TFE | Available | Available | 4.3 | 92 | +6 |
| Experimental example 28 | Graphite | PVDF/HFP/MMM | Available | Available | 4.3 | 95 | +4 |
| Experimental example 29 | Graphite | PVDF/HFP | Not available | Available | 4.3 | 47 | +56 |
| Experimental example 30 | Graphite | PVDF/MMM | Not available | Available | 4.3 | 51 | +53 |
| Experimental example 31 | Graphite | PVDF/CTFE | Not available | Available | 4.3 | 47 | +57 |
| Experimental example 32 | Graphite | PVDF/TFE | Not available | Available | 4.3 | 46 | +56 |
| Experimental example 33 | Graphite | PVDF/HFP/MMM | Not available | Available | 4.3 | 50 | +54 |

In the experimental example 1, a coating of PVDF was formed on the surface of graphite by means of proper heating treatment, which made it possible to confirm that both the cycle retention ratio and the thickness change rate were improved as compared with a case where the heating treatment was not performed, and particulate PVDF was present on the surface of graphite was found in the experimental example 2, for example.

Further, even when CMC was further added as an anode binder like the experimental example 3, it was confirmed that both the cycle retention ratio and the thickness change rate were improved as compared with a case where the heating treatment was not performed like the experimental example 4. From comparison between the experimental example 1 and the experimental example 3, it was found that both the cycle retention ratio and the thickness change rate were further improved by further adding the CMC as the anode binder.

Similarly, even when polyacrylic acid (experimental example 6), sodium polyacrylate (experimental example 7), polyvinyl alcohol (experimental example 8), or polyacrylamide (experimental example 9) were further added as the anode binder, both the cycle retention ratio and the thickness change rate were improved in comparison with the experimental example 1.

Even when polyethylene oxide (PEO) was further added as the anode binder, both the cycle retention ratio and the thickness change rate were improved as compared with the experimental example 2 where the coating was not formed. As compared with the experimental example 1, however, a slight decrease in the cycle retention ratio and a slight increase in the thickness change rate were found.

Moreover, it was found that the experimental example 3 where a portion of the surface of the anode active material was covered with a coating was superior to the experimental example 10 where the entire surface of the anode active material was covered with a coating in terms of both the cycle retention ratio and the thickness change rate. It was considered that it was because covering a portion of the surface of the anode active material with a coating instead of the entire surface of the anode active material made it possible to improve lithium ion acceptance.

It was understood that effects similar to those of the experimental example 3 were also achieved by applying PVDF onto the separator 35 beforehand like the experimental example 11.

It was found that both the cycle retention ratio and the thickness change rate were further improved in a case where the gel electrolyte layer 36 was formed (experimental example 3) as compared with a case where the gel electrolyte layer 36 was not formed (experimental example 12). In the experimental example 12, however, it was confirmed that both the cycle retention ratio and the thickness change rate were improved as compared with the experimental examples 4 and 13 where the coating was not formed.

Further, in the experimental examples 14 and 16, from comparison with the experimental examples 20 to 22, it was found that effects of coatings to cover the anode active material were achieved even in a case where a material other than graphite, such as silicon or tin was included as the anode active material.

Moreover, from comparison with the experimental example 17 and the experimental example 23, it was found that effects of coatings to cover the anode active material were achieved even in a case where styrene-butadiene rubber (SBR) was further added to the anode active material layer 34B.

Additionally, from comparison with the experimental example 18 and the experimental example 19, it was found that effects of coatings to cover the anode active material were achieved even in a case where the upper limit voltage at the time of charge was set to 4.2 V.

Further, it was confirmed that both the cycle retention ratio and the thickness change rate were improved even when various kinds of copolymers of polyvinylidene fluoride were used as the anode binder like the experimental examples 24 to 28, as compared with a case where the heating treatment was not performed like the experimental examples 29 to 33.

The present technology is described thus far with reference to some embodiments and examples thereof; however, the present technology is not limited to the examples described in the embodiments and examples above, but various modifications may be made. For example, the description is provided with reference to examples where a battery structure is of the cylindrical type, the laminated film type, and the square type, and the battery element has the spirally wound structure; however, the battery structure and the battery element structure are not limited thereto. The secondary battery of the present technology is similarly applicable also to a case in which other battery structure such as that of a coin type or a button type is employed. Moreover, the secondary battery of the present technology is similarly applicable also to a case in which the battery element has other structure such as a stacked structure. Further, the anode materials, additives, or any other materials are also not limited to those described in the above-described embodiments and examples, and various kinds of materials may be usable.

Moreover, the secondary battery-use anode active material and the secondary battery-use anode of the present technology may be applied to electrochemical devices other than the secondary battery. Non-limiting examples of the other electrochemical device may include a capacitor.

Note that the effects described in the present specification are illustrative and non-limiting. The present technology may have effects other than those described in the present specification. Further, the present technology may have the following configurations.

<1>
A secondary battery-use anode active material, including a surface covered with one or a plurality of coatings containing one or both of polyvinylidene fluoride and a copolymer of polyvinylidene fluoride.

<2>
The secondary battery-use anode active material according to <1>, wherein the coating further contains a water-soluble polymer.

<3>
The secondary battery-use anode active material according to <1> or <2>, wherein the water-soluble polymer is carboxymethyl cellulose (CMC), polyacrylic acid, polyacrylate, polyvinyl alcohol, or polyacrylamide.

<4>
The secondary battery-use anode active material according to any one of <1> to <3>, wherein the copolymer of the polyvinylidene fluoride is a copolymer of vinylidene fluoride and one or more of monomethyl maleate (MMM), hexafluoropyrene (HFP), tetrafluoroethylene (TFE), and chlorotrifluoroethylene (CUE).

<5>
The secondary battery-use anode active material according to any one of <1> to <4>, wherein a portion of the surface is covered with the coating.

<6>
The secondary battery-use anode active material according to any one of <1> to <3>, wherein the surface is covered with the plurality of coatings distributed discretely.

<7>
The secondary battery-use anode active material according to any one of <1> to <6>, further including one or more of graphite, silicon (Si), and tin (Sn) as a constituent element.

<8>
A secondary battery-use anode, including:
an anode current collector; and
an anode active material layer that includes an anode active material, and is provided on the anode current collector, a surface of the anode active material being covered with one or more coatings containing one or both of polyvinylidene fluoride and a copolymer of polyvinylidene fluoride.

<9>
The secondary battery-use anode according to <8>, wherein the anode active material layer is formed on the anode current collector by a coating method.

<10>
The secondary battery-use anode according to <8> or <9>, wherein the anode active material layer includes one or more of polyvinylidene fluoride and a copolymer of polyvinylidene fluoride, a water-soluble polymer, and a synthetic rubber.

<11>
A secondary battery, including:
a cathode; an anode; and an electrolytic solution,
the anode including
an anode current collector; and
an anode active material layer that includes an anode active material, and is provided on the anode current collector, a surface of the anode active material being covered with one or more coatings containing one or both of polyvinylidene fluoride and a copolymer of polyvinylidene fluoride.

\<12\>

The secondary battery according to <11>, wherein an open-circuit voltage in a completely-charged state is 4.3 V or higher

\<13\>

The secondary battery according to <11> or <12>, further including a fluoride-containing polymer layer between the cathode and the anode.

\<14\>

The secondary battery according to <13>, further including a separator between the cathode and the anode, wherein the fluoride-containing polymer layer is the separator that is impregnated with the electrolytic solution.

\<15\>

The secondary battery according to <13>, wherein the fluoride-containing polymer layer is a gel electrolyte layer configured in which the electrolytic solution is held with a polymer compound.

\<16\>

A battery pack, including:
a secondary battery;
a controller that controls an operation of the secondary battery; and
a switch section that switches the operation of the secondary battery in accordance with an instruction from the controller,
the secondary battery including a cathode, an anode, and an electrolytic solution, and
the anode including an anode current collector and an anode active material layer that includes an anode active material, and is provided on the anode current collector, a surface of the anode active material being covered with one or more coatings containing one or both of polyvinylidene fluoride and a copolymer of polyvinylidene fluoride.

\<17\>

An electric vehicle, including:
a secondary battery;
a converter that converts electric power supplied from the secondary battery into drive power;
a drive section that operates in accordance with the drive power; and
a controller that controls an operation of the secondary battery,
the secondary battery including a cathode, an anode, and an electrolytic solution, and
the anode including an anode current collector and an anode active material layer that includes an anode active material, and is provided on the anode current collector, a surface of the anode active material being covered with one or more coatings containing one or both of polyvinylidene fluoride and a copolymer of polyvinylidene fluoride.

\<18\>

An electric power storage system, including:
a secondary battery;
one or more electric devices that are supplied with electric power from the secondary battery; and
a controller that controls the supplying of the electric power from the secondary battery to the one or more electric devices,
the secondary battery including a cathode, an anode, and an electrolytic solution, and
the anode including an anode current collector and an anode active material layer that includes an anode active material, and is provided on the anode current collector, a surface of the anode active material being covered with one or more coatings containing one or both of polyvinylidene fluoride and a copolymer of polyvinylidene fluoride.

\<19\>

An electric power tool, including:
a secondary battery; and
a movable section that is supplied with electric power from the secondary battery,
the secondary battery including a cathode, an anode, and an electrolytic solution, and
the anode including an anode current collector and an anode active material layer that includes an anode active material, and is provided on the anode current collector, a surface of the anode active material being covered with one or more coatings containing one or both of polyvinylidene fluoride and a copolymer of polyvinylidene fluoride.

\<20\>

An electronic apparatus, including a secondary battery as an electric power supply source, the secondary battery including a cathode, an anode, and an electrolytic solution, and
the anode including an anode current collector and an anode active material layer that includes an anode active material, and is provided on the anode current collector, a surface of the anode active material being covered with one or more coatings containing one or both of polyvinylidene fluoride and a copolymer of polyvinylidene fluoride.

This application claims the priority on the basis of Japanese Patent Application No, 2014-147657 filed on Jul. 18, 2014 in Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A secondary battery-use anode active material, comprising a surface that is only partially covered with one or a plurality of melted coatings comprising one or both of polyvinylidene fluoride and a copolymer of polyvinylidene fluoride,
wherein the anode active material consists essentially of a carbon material and a metal-based material,
wherein the metal-based material is selected from the group consisting of tin (Sn), LiSnO, $Mg_2Sn$, $SnO_w$ ($0<w<2$), $SnSiO_3$, and combinations thereof.

2. The secondary battery-use anode active material according to claim 1, wherein the one or a plurality of melted coatings further comprises a water-soluble polymer.

3. The secondary battery-use anode active material according to claim 2, wherein the water-soluble polymer is selected from the group consisting of carboxymethyl cellulose (CMC), polyacrylic acid, polyacrylate, polyvinyl alcohol, or polyacrylamide, and combinations thereof.

4. The secondary battery-use anode active material according to claim 1, wherein the copolymer of the polyvinylidene fluoride is a copolymer of vinylidene fluoride and one or more of monomethyl maleate (MMM), hexafluoropropylene (HFP), tetrafluoroethylene (TFE), and chlorotrifluoroethylene (CTFE).

5. The secondary battery-use anode active material according to claim 1, wherein the surface has been covered with the plurality of melted coatings distributed discretely.

6. The secondary battery-use anode active material according to claim 1, wherein the metal-based material is tin (Sn).

7. The secondary battery-use anode active material according to claim 1, wherein the anode active material forms an active material layer on one or more surfaces of a current collector.

8. The secondary battery-use anode active material according to claim 1, wherein the metal-based material is selected from the group consisting of LiSnO, $Mg_2Sn$, $SnO_w$ ($0<w<2$), and $SnSiO_3$.

9. The secondary battery-use anode active material according to claim 1, wherein the carbon material is graphite.

10. A secondary battery-use anode active material, comprising a surface that is only partially covered with one or a plurality of melted coatings comprising one or both of polyvinylidene fluoride and a copolymer of polyvinylidene fluoride, wherein the anode active material consists essentially of a carbon material and a metal-based material,
wherein the metal based material is selected from the group consisting of silicon (Si), $SiB_4$, $SiB_6$, $Mg_2Si$, $Ni_2Si$, TiSi, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v<2$), LiSiO, and combinations thereof.

11. The secondary battery-use anode active material according to claim 10, wherein the metal-based material is selected from the group consisting of $SiB_4$, $SiB_6$, $Mg_2Si$, $Ni_2Si$, TiSi, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v<2$), $SnSiO_3$, and LiSiO.

12. The secondary battery-use anode active material according to claim 10, wherein the metal-based material is silicon.

13. The secondary battery-use anode active material according to claim 10, wherein the carbon material is graphite.

14. The secondary battery-use anode active material according to claim 10, wherein the one or a plurality of melted coatings further contains a water-soluble polymer.

15. The secondary battery-use anode active material according to claim 14, wherein the water-soluble polymer is selected from the group consisting of carboxymethyl cellulose (CMC), polyacrylic acid, polyacrylate, polyvinyl alcohol, polyacrylamide, and combinations thereof.

16. The secondary battery-use anode active material according to claim 10, wherein the copolymer of the polyvinylidene fluoride is a copolymer of vinylidene fluoride and one or more of monomethyl maleate (MMM), hexafluoropropylene (HFP), tetrafluoroethylene (TFE), and chlorotrifluoroethylene (CTFE).

17. The secondary battery-use anode active material according to claim 10, wherein the surface is covered with the plurality of melted coatings distributed discretely.

18. A secondary battery-use anode active material, comprising a surface that is covered with one or a plurality of melted coatings comprising one or both of polyvinylidene fluoride and a copolymer of polyvinylidene fluoride, wherein the anode active material consists of a carbon material and a metal-based material, wherein the metal-based material is selected from the group consisting of $SiB_4$, $SiB_6$, $Mg_2Si$, $Ni_2Si$, TiSi, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v<2$), $SnSiO_3$, LiSiO, LiSnO, $Mg_2Sn$, $SnO_w$ ($0<w<2$), and combinations thereof.

19. The secondary battery-use anode active material according to claim 18, wherein the surface is only partially covered with the one or a plurality of melted coatings.

20. The secondary battery-use anode active material according to claim 18, wherein the one or a plurality of melted coatings further contains a water-soluble polymer selected from the group consisting of carboxymethyl cellulose (CMC), polyacrylic acid, polyacrylate, polyvinyl alcohol, polyacrylamide, and combinations thereof.

21. The secondary battery-use anode active material according to claim 18, wherein the copolymer of the polyvinylidene fluoride is a copolymer of vinylidene fluoride and one or more of monomethyl maleate (MMM), hexafluoropropylene (HFP), tetrafluoroethylene (TFE), and chlorotrifluoroethylene (CTFE).

* * * * *